(12) United States Patent
Sato et al.

(10) Patent No.: US 7,841,211 B2
(45) Date of Patent: Nov. 30, 2010

(54) PRODUCTION PROCESS OF SYNTHETIC QUARTZ GLASS

(75) Inventors: Tatsuhiro Sato, Koriyama (JP); Takahiro Kaitou, Yokosuka (JP); Akira Fujinoki, Koriyama (JP); Toshiyuki Kato, Koriyama (JP); Tohru Segawa, Koriyama (JP); Nobumasa Yoshida, Koriyama (JP)

(73) Assignee: Shin-Etsu Quartz Products Co., Ltd., Tokyo (JP)

( * ) Notice: Subject to any disclaimer, the term of this patent is extended or adjusted under 35 U.S.C. 154(b) by 914 days.

(21) Appl. No.: 10/535,935

(22) PCT Filed: Nov. 28, 2003

(86) PCT No.: PCT/JP03/15272

§ 371 (c)(1),
(2), (4) Date: May 23, 2005

(87) PCT Pub. No.: WO2004/050570

PCT Pub. Date: Jun. 17, 2004

(65) Prior Publication Data

US 2006/0059948 A1 Mar. 23, 2006

(30) Foreign Application Priority Data

| Nov. 29, 2002 | (JP) | 2002-348163 |
| Apr. 21, 2003 | (JP) | 2003-115795 |
| Jun. 24, 2003 | (JP) | 2003-179211 |
| Jul. 9, 2003 | (JP) | 2003-272570 |
| Nov. 18, 2003 | (JP) | 2003-388051 |

(51) Int. Cl.
*C03B 20/00* (2006.01)
*C03B 19/14* (2006.01)

(52) U.S. Cl. .................. 65/32.1; 65/30.1; 65/111

(58) Field of Classification Search .......... 65/32.1, 65/111, 157

See application file for complete search history.

(56) References Cited

U.S. PATENT DOCUMENTS 4,789,389 A * 12/1988 Schermerhorn et al. ....... 65/390

(Continued)

FOREIGN PATENT DOCUMENTS

JP 54-127914 A1 10/1979

(Continued)

OTHER PUBLICATIONS

PCT International Search Report for PCT/JP03/15272 mailed on Mar. 9, 2004.

*Primary Examiner*—Richard Crispino
*Assistant Examiner*—Cynthia Szewczyk
(74) *Attorney, Agent, or Firm*—Rader, Fishman & Grauer PLLC

(57) ABSTRACT

First of all, there is provided a production process of a synthetic quartz glass which has less impurity, has a high-temperature viscosity characteristic equal to or more than that of a natural quartz glass, and hardly deforms even in a high-temperature environment, and especially a production process of a highly heat resistant synthetic quartz glass which is free from the generation of bubbles and is dense. Secondly, there is provided a highly heat resistant synthetic quartz glass body which is easily obtained by the production process of the present invention, and especially a transparent or black quartz glass body which is free from the generation of bubbles, is dense, has high infrared absorption rate and emission rate, and has an extremely high effect for preventing diffusion of alkali metal. The process is a process of producing a highly heat resistant quartz glass body having an absorption coefficient at 245 nm of 0.05 $cm^{-1}$ or more, and the silica porous body was subjected to a reduction treatment, followed by baking, thereby forming a dense glass body.

13 Claims, 7 Drawing Sheets

U.S. PATENT DOCUMENTS

| | | | |
|---|---|---|---|
| 5,043,002 A * | 8/1991 | Dobbins et al. | 65/386 |
| 5,707,908 A * | 1/1998 | Komine et al. | 501/53 |
| 5,766,291 A * | 6/1998 | Sato et al. | 65/17.3 |
| 5,908,482 A * | 6/1999 | Komine et al. | 65/17.6 |
| 6,012,304 A * | 1/2000 | Loxley et al. | 65/111 |
| 6,044,664 A * | 4/2000 | Yajima et al. | 65/414 |
| 6,381,986 B1 * | 5/2002 | Loxley et al. | 65/17.5 |
| 6,499,315 B1 * | 12/2002 | Nishimura et al. | 65/17.4 |
| 2002/0001691 A1 * | 1/2002 | Sabi et al. | 428/64.4 |
| 2002/0017114 A1 * | 2/2002 | Fukui et al. | 65/17.2 |
| 2002/0038557 A1 * | 4/2002 | Matsuo et al. | 65/17.4 |
| 2003/0051507 A1 * | 3/2003 | Ikuta et al. | 65/30.1 |

FOREIGN PATENT DOCUMENTS

| | | |
|---|---|---|
| JP | 03-083833 A1 | 4/1991 |
| JP | 04-254433 A1 | 9/1992 |
| JP | 07-300324 A1 | 11/1995 |
| JP | 09-309735 A | 12/1997 |
| JP | 11-310423 A1 | 11/1999 |
| JP | 2000-169155 | 6/2000 |
| JP | 2003-012331 A1 | 1/2003 |
| JP | 2003-179207 A | 6/2003 |
| WO | WO-03/002473 A1 | 1/2003 |

* cited by examiner

PRODUCTION PROCESS OF SYNTHETIC QUARTZ GLASS

TECHNICAL FIELD

The present invention relates to a production process of a synthetic quartz glass obtained by heat treating a porous synthetic glass body and to a highly heat resistant synthetic quartz glass body.

BACKGROUND ART

For the production of a synthetic quartz glass, there is well known a process of producing it by densifying a silica porous body mainly obtained by flame hydrolysis of a silicon halide at high temperatures. Since the thus obtained synthetic quartz glass body has passed through the flame hydrolysis step, it contains a large amount of an OH group in the silica porous body. If a large amount of an OH group is present in the synthetic quartz glass, the viscosity of the synthetic quartz glass is lowered, whereby the heat resistance is lowered. Accordingly, the subject synthetic quartz glass causes deformation and is not preferable for applications of quartz glass jigs for the semiconductor industry to be used at 1,000° C. or higher.

As a countermeasure thereto, JP-A-54-127914 discloses the preparation of an anhydrous glass matrix by thermally oxidizing or hydrolyzing a glass forming raw material to deposit a glass forming substance containing silicon dioxide ($SiO_2$) as the major component on the end faces of a supporting rod, thereby preparing a porous glass and exposing this porous glass sintered body to a glass forming raw material gas containing a halogen element at from 800 to 1,000° C., followed by transparent vitrification. As the glass forming raw material gas, $SiCl_4$, $SiBr_4$, $GeCl_4$, $BBr_3$, $POCl_3$, $PCl_3$, and the like are exemplified.

Since the synthetic quartz glass obtained by the foregoing process contains less impurity, it has been expected as a substitute for a quartz glass raw material made of a natural quartz crystal as the raw material in the semiconductor manufacturing steps, but deformation in the high-temperature manufacturing steps has been recognized as a remarkable drawback.

Even if the OH group in the quartz glass is completely dehydrated by a dehydration treatment using the foregoing chlorine based gas, there was a limit in the value of increasing viscosity. Though this value was slightly larger than that of an undehydrated synthetic quartz glass, it was explicitly smaller than that of a natural quartz glass. In general, the viscosity of the synthetic quartz glass (poise being used as a unit of the viscosity in the present invention) is 11.4 for the undehydrated article, 11.6 for the dehydrated article, and 11.9 or more for the natural quartz glass, respectively in terms of a value of log η at 1,280° C.

As a process of producing a highly heat resistant glass, JP-A-3-83833 discloses a method of containing Al. However, according to this method, there was involved a problem that impurities such as metal impurities are contained.

Also, as a gas for removing the OH group in the porous body, ammonia or an ammonia based gas can be used in place of the halogen based gas such as chlorine. However, in this case, bubbles are frequently generated in the glass after transparent vitrification due to an NH group remaining after the dehydration reaction, thereby allowing no commercialization to be realized.

As a method of solving the problem of the generation of bubbles, JP-A-7-300324 proposes a method in which a nitrogen-doped porous body obtained by a heating treatment in an ammonia-containing atmosphere is baked by heating in a non-oxidative atmosphere, and the subject baked body is subjected to a high-temperature heating treatment under a high pressure of 500 kg/cm$^2$ or more in the temperature range of from 1,400° C. to 2,000° C. However, according to the subject method, since the heating treatment under a high pressure is required, a special device was necessary.

Also, in the case where the heating treatment temperature exceeds 1,000° C., the quartz glass jig irregularly reflects infrared rays, and the temperature in a furnace becomes non-uniform. There were thus caused problems such as the matter that the material quality of a silicon wafer becomes instable.

On the other hand, as a process of producing a black quartz glass, there has hitherto been known a method of coloring it black by adding a metal oxide such as copper oxide, manganese dioxide, chromium sesquioxide, iron sesquioxide, and vanadium pentoxide (JP-A-4-254433, etc.). However, according to the method of using a blackening agent, it was difficult to obtain a completely uniform black glass.

In the meantime, in the semiconductor manufacturing steps, it is thought that an alkali metal such as Na, K, and Li is an element to bring about a defect on a device. In the case where the foregoing metallic contamination is brought from a treatment furnace in the heating treatment step of a silicon wafer, a quartz tube and a quartz boat for setting the silicon wafer play a role to prevent the contamination. However, in electrically fusible low-OH natural quartz or chlorine-free synthetic quartz-made quartz glass raw materials, the foregoing effect for preventing the foregoing contamination was low.

DISCLOSURE OF THE INVENTION

First of all, the present invention is aimed to provide a production process of a synthetic quartz glass which has less impurity, has a high-temperature viscosity characteristic equal to or more than that of a natural quartz glass, and hardly deforms even in a high-temperature environment, and especially a production process of a highly heat resistant synthetic quartz glass which is free from the generation of bubbles and is dense.

Secondly, the present invention is aimed to provide a highly heat resistant synthetic quartz glass body which is easily obtained by the production process of the present invention, and especially a transparent or black quartz glass body which is free from the generation of bubbles, is dense, has high infrared absorption rate and emission rate, and has an extremely high effect for preventing diffusion of alkali metal.

In order to solve the foregoing problems, the present inventors made extensive and intensive investigations. As a result, it has been found that a synthetic quartz glass having a large absorption band in the wavelength region of about 245 nm (5.0 eV) in the measurement of a transmittance in an ultraviolet region has excellent high resistance.

Also, since synthetic quartz glasses obtained by the conventional production processes are accompanied with a hydrolysis reaction, a large amount of a hydroxyl group is contained in the resulting porous body. This hydroxyl group lowers the viscosity of a glass and is not preferable as a quartz raw material to be used in the field of semiconductor industry. Therefore, there is usually employed a dehydration treatment by using a chlorine based gas and reacting it with the hydroxyl group in the porous body, thereby removing the hydroxyl group as described previously. However, according to the dehydration treatment with a chlorine based gas, a considerable amount of chlorine remains in the porous body.

As a result of extensive and intensive investigations, the present inventors have found that the chlorine remaining in the porous body is one factor to lower the viscosity of the quartz glass which has been densified by a heat treatment at high temperatures. Further, it has been found that in order to increase the viscosity at high temperature, not only dehydration may be completely carried out during a period of time of from the dehydration treatment in the porous body to entry in the densifying step, but also the concentration of the residual chlorine may be lowered to a level at which no influence is given to the viscosity.

Also, the present inventors have found that transparent and black quartz glass bodies can be easily obtained depending upon the reaction temperature in a reduction treatment of the silica porous glass or a molar ratio of the hydroxyl group in the silica porous body to a reducing gas.

The production process of a synthetic quartz glass of the present invention is a process of producing a quartz glass having an absorption coefficient at 245 nm of 0.05 $cm^{-1}$ or more, which is characterized by subjecting a silica porous body to a reduction treatment and a baking treatment to form a dense glass body. The foregoing silica porous body may or may not contain a hydroxyl group.

In the production process of a synthetic quartz glass of the present invention, the baking treatment may be carried out after carrying out the reduction treatment, or the reduction treatment and the baking treatment may be carried out at the same time.

The foregoing reduction treatment is not particularly limited but is suitably a treatment in which the foregoing silica porous body is reacted in vacuo or reacted with the reducing gas in an atmosphere containing the subject gas in a prescribed temperature range.

In the production process of a synthetic quartz glass of the present invention, it is suitable that after carrying out the foregoing reduction treatment at a reaction temperature of 100° C. or higher and 1,300° C. or lower, and preferably 500° C. or higher and 1,000° C. or lower, the foregoing baking treatment is carried out at a reaction temperature of 1,300° C. or higher and 1,900° C. or lower, and preferably 1,300° C. or higher and 1,750° C. or lower, thereby obtaining a dense glass body. Also, in the case of carrying out the reduction treatment and the baking treatment at the same time, it is possible to employ a reaction temperature of 100° C. or higher and 1,900° C. or lower. In the production process of a synthetic quartz glass of the present invention, it is preferable that the foregoing baking treatment is carried out under a reduced pressure.

As the foregoing reducing gas (sometimes referred to as "reaction gas"), a gas containing at least one kind of nitrogen, carbon and chlorine is preferable. Specific examples thereof include ammonia ($NH_3$), hydrazine ($N_2H_4$), ethanol ($C_2H_5OH$), carbon monoxide (CO), and chlorine ($Cl_2$).

Also, as the foregoing reducing gas, volatile silicon compounds, especially volatile silicon compounds containing at least one kind of nitrogen, carbon and chlorine are more preferable. Specific examples thereof include silicon tetrachloride ($SiCl_4$), hexamethyldisilazane ($[(CH_3)_3Si]_2NH$), and trichloromethylsilane ($(CH_2Cl)_3SiH$).

Further, as the foregoing reducing gas, volatile silicon compounds containing nitrogen and/or carbon are especially preferable.

The foregoing reducing gas can be used singly or in admixture of two or more kinds thereof. In the case where a mixture of two or more kinds thereof is used, its combination is not particularly limited, and for example, a mixture of a volatile silicon compound containing nitrogen and/or carbon and ammonia can be used.

Specifically, as the foregoing volatile silicon compound, at least one kind of compound selected from the group consisting of a silazane, an organosilazane, an organohalogen silane, a siloxane, an organosiloxane, an alkoxysilane, an aroxysilane, a silane, an organosilane, and an organopolysilane is preferable; and hexamethyldisilazane and hexamethyldisiloxane are more preferable.

In the production process of a synthetic quartz glass of the present invention, it is possible to obtain a transparent glass body by carrying out the foregoing reduction treatment at a reaction temperature of 100° C. or higher and 800° C. or lower and then carrying out baking at 1,300° C. or higher and 1,900° C. or lower preferably under a reduced pressure.

In the production process of a synthetic quartz glass of the present invention, it is possible to obtain a densified black glass body by carrying out the reduction treatment in which the foregoing silica porous body is reacted with a carbon-containing gas at 400° C. or higher and 1,300° C. or lower and then carrying out baking at 1,300° C. or higher and 1,900° C. or lower preferably under a reduced pressure.

Also, in the foregoing reduction treatment, it is possible to produce a transparent quartz glass body by using a reducing gas in a molar number of from 0.1 to 3.0 times the molar number of the hydroxyl group contained in the silica porous body.

In the foregoing reduction treatment, it is possible to produce a black quartz glass body by using a reducing carbon-containing gas in a molar number of from 2 to 10 times the molar number of the hydroxyl group contained in the foregoing silica porous body.

In the production process of a synthetic quartz glass of the present invention, it is possible to obtain a synthetic quartz glass body having a very excellent high-temperature viscosity characteristic by carrying out a heating treatment (hydrogen treatment) in a hydrogen-containing atmosphere.

As a first example of the foregoing method including a hydrogen treatment, there is enumerated a method in which after the foregoing reduction treatment, the heating treatment is carried out in a hydrogen-containing atmosphere, followed by carrying out a baking treatment to form a dense glass body. It is preferable that the foregoing heating treatment in a hydrogen-containing atmosphere is carried out in the temperature range of from 100° C. to 1,300° C.

As a second example of the foregoing method including a hydrogen treatment, there is enumerated a method in which the foregoing reduction treatment is carried out in an atmosphere containing the foregoing reducing gas (for example, the foregoing volatile silicon compounds containing nitrogen and/or carbon, ammonia, and mixtures thereof) and hydrogen.

As a third example of the foregoing method including a hydrogen treatment, there is enumerated a method in which the foregoing baking treatment is carried out in a hydrogen-containing atmosphere. In this case, it is suitable that the foregoing baking treatment is carried out in the temperature range of from 1,000° C. to 1,900° C.

As a fourth example of the foregoing method including a hydrogen treatment, there is enumerated a method in which the silica porous body is reacted with a reducing gas in a hydrogen-containing atmosphere, thereby carrying out reduction treatment and a baking treatment at the same time. In this case, it is preferable that the foregoing reduction treatment and baking treatment are carried out at a reaction temperature in the range of from 100° C. to 1,900° C.

In the production process of a synthetic quartz glass of the present invention, it is preferable that after the foregoing reduction treatment, a heating treatment (ammonia treatment) is carried out in an ammonia-containing atmosphere, followed by baking to form a dense glass body. It is suitable that this heating treatment in an ammonia-containing atmosphere is carried out in the temperature range of from 100° C. to 1,300° C.

Also, after the reduction treatment, the foregoing hydrogen treatment and the foregoing ammonia treatment can be employed in combination. In the case of employing the both treatments in combination, the order is not particularly limited, but any one of them may be first carried out, or the both treatments may be carried out at the same time, that is, a heating treatment may be carried out in an atmosphere containing hydrogen and ammonia.

In the production process of a synthetic quartz glass of the present invention, by further heat treating a dense glass body obtained by the foregoing baking treatment in a non-oxidative atmosphere under a pressure exceeding the atmospheric pressure in the temperature range of from 1,200° C. to 1,900° C., a highly heat resistant synthetic quartz glass which is free from the generation of bubbles and is dense is obtained. It is suitable that the foregoing reduction treatment is carried out in an atmosphere containing the foregoing volatile silicon compound containing nitrogen and/or carbon in at a reaction temperature of from 100° C. to 1,300° C.; baking is then carried out at from 1,300° C. to 1,750° C. under a reduced pressure to form a dense quartz glass body; and thereafter, the dense quartz glass body is heat treated in an inert gas atmosphere under a pressure of from a pressure exceeding the atmospheric pressure to 10,000 kg/cm$^2$ in the temperature range of from 1,200° C. to 1,900° C.

A first embodiment of the synthetic quartz glass body of the present invention is a quartz glass body produced by the production process of a synthetic quartz glass of the present invention.

A second embodiment of the synthetic quartz glass body of the present invention is a highly heat resistant synthetic quartz glass body which is characterized by having an absorption coefficient at 245 nm of 0.05 cm$^{-1}$ or more and having a carbon concentration, a nitrogen concentration and a chlorine concentration to be contained of 10,000 ppm or less, respectively.

A third embodiment of the synthetic quartz glass body of the present invention is a transparent quartz glass body produced by the production process of a synthetic quartz glass of the present invention, which is characterized by having a nitrogen concentration to be contained of 100 ppm or less and a carbon concentration to be contained of 100 ppm or less.

In the foregoing transparent quartz glass body of the present invention, by controlling the nitrogen concentration and the carbon concentration to be contained at 50 ppm or less, and more preferably 20 ppm or less, respectively, a highly heat resistant synthetic quartz glass body which is free from the generation of bubbles and does not form bubbles in not only the electrical heating step and the flame heating processing step is obtained. In this case, in order to control the amounts of residual nitrogen and carbon at 50 ppm or less, respectively, it is important that the molar number of the foregoing reducing gas to be thrown is controlled at from 0.1 to 3.0 times the molar number of the OH group contained in the foregoing silica porous body.

A fourth embodiment of the synthetic quartz glass body of the present invention is a black quartz glass body produced by the production process of a synthetic quartz glass of the present invention, which is characterized by having a carbon concentration to be contained exceeding 100 ppm and 10,000 ppm or less.

In order to produce a raw material having a carbon concentration in the range of from 100 ppm to 10,000 ppm, it is important that in the foregoing reduction treatment, a carbon-containing gas, preferably a carbon-containing volatile silicon compound is used as the reducing gas, and the molar number of the subject carbon-containing gas to be thrown is controlled at from 2 to 10 times the molar number of the OH group in the silica porous body. In this way, sufficient carbon remains, whereby an entirely uniform black quartz glass raw material is baked. By using it, black quartz glass blocks, cylinders, plates and tubes and jigs such as quartz boats are produced.

These quartz glass members have high infrared absorption rate and emission rate, form an entirely uniform isothermal region, and are extremely suitable for the heating treatment of silicon wafers and the like.

Also, in the case of obtaining a quartz glass body having a desired shape by molding this raw material, it is suitable that the heating means is carried out by electrical melt heating. According to flame heat melting, carbon in the black portion reacts with a flame gas, thereby likely causing the generation of bubbles. On the other hand, according to electrical melt heating, since heat transfer by infrared radiation is the main current, by employing an inert gas or a vacuum atmosphere, it is possible to prevent the reaction with the gas from occurring. In the foregoing electrical melt heating, general carbon heating furnaces, ohmic-resistance heating furnaces, induction heating furnaces, and the like are employed.

Also, in producing a quartz jig, for example, a member having a complicated shape such as a boat using the foregoing black quartz glass body as a raw material, it is preferable that a part is skived out by grinding (for example, NC grinding and GC grinding) and assembled to form a final shape. Concretely, only steps of subjecting the foregoing black quartz glass body of the present invention to grinding processing by cutting out the black portion thereof and then assembling are taken, and heating processing with a gas is not employed, thereby preparing a member.

A fifth embodiment of the synthetic quartz glass body of the present invention is a dense quartz glass body produced by the production process of a synthetic quartz glass of the present invention, which is characterized in that the subject quartz glass body has a transparent portion having a nitrogen concentration and a carbon concentration of 50 ppm or less, respectively in its surface site and has a black portion having a carbon concentration in the range of from 100 to 10,000 ppm in its inside.

The foregoing reduction treatment is a treatment in which a hydroxyl group-containing silica porous body is reacted with a carbon-containing gas, preferably a carbon-containing volatile silicon compound. By using the subject carbon-containing gas in a molar number of from 2 to 10 times the molar number of the hydroxyl group in the subject silica porous body, it is possible to produce a quartz glass body having a black portion having a carbon concentration in the range of from 100 to 10,000 ppm in its inside with ease. It is possible to form the transparent portion of the surface into a desired thickness by adjusting the degree of vacuum of the atmosphere and the treatment time in the step of baking the porous glass body.

Quartz glass blocks, cylinders, plates and tubes and jigs such as quartz boats, which are produced from a quartz glass body having a transparent portion having a nitrogen concentration and a carbon concentration of 50 ppm or less, respectively in its surface site (surface thickness: from 1 mm to 20 mm) and a black portion having a carbon concentration in the range of from 100 to 10,000 ppm in its inside, are a uniformly infrared absorbing member and have a transparent low-carbon portion as a non-reactive portion in the surface portion thereof. Therefore, they can be subjected to usual flame heating processing and become a raw material which is extremely useful and rich in processing functionality.

In the first to fifth embodiments of the synthetic quartz glass body of the present invention, the OH group concentration to be contained is preferably 30 ppm or less, and more preferably 10 ppm or less.

A sixth embodiment of the synthetic quartz glass body of the present invention is a dense quartz glass produced by the production process of a synthetic quartz glass of the present invention, which is characterized in that the subject quartz glass body has a portion having an OH group concentration of 10 ppm or less in its surface site (surface thickness: from 1 mm to 20 mm) and a portion having an OH group concentration in the range of from 10 ppm to 300 ppm in its inside.

In the foregoing sixth embodiment of the synthetic quartz glass body, the foregoing reduction treatment is a treatment in which a hydroxyl group-containing silica porous body is reacted with a volatile silicon compound containing carbon and/or nitrogen and containing a halogen element, preferably trichloromethylsilane, and the halogen element concentration in the foregoing surface site is preferably from 100 to 5,000 ppm. Also, it is preferable that the foregoing surface site has a nitrogen concentration of 50 ppm or less and/or a carbon concentration of 50 ppm or less.

In the foregoing reduction treatment, it is suitable to use the foregoing reducing gas in a molar number of from 0.1 to 3.0 times the molar number of the hydroxyl group contained in the foregoing silica porous body.

For example, in the case where the foregoing reducing gas is a halogen element-containing volatile silicon compound, the surface site of the dense quartz glass body obtained by baking has a halogen element concentration of from 100 to 5,000 ppm and an OH group concentration of 10 ppm or less. At this time, when the reaction is ended before the foregoing volatile silicon compound has been thoroughly diffused into the inside of the silica porous body, the reaction is not thoroughly achieved in the subject inside, whereby from 10 ppm to 300 ppm of the OH group remains.

Plates and tubes and jigs such as quartz boats made of the thus obtained quartz glass body having an OH group in its inside as the raw material become a highly functional quartz jig having an extremely high effect for preventing diffusion of an alkali metal from occurring.

BEST MODE FOR CARRYING OUT THE INVENTION

Embodiments for carrying out the present invention will be described below with reference to the accompanying drawings, but the illustrated examples are exemplarily shown. Needless to say, various modifications can be made herein unless the technical thought of the present invention is deviated.

Figure 1:
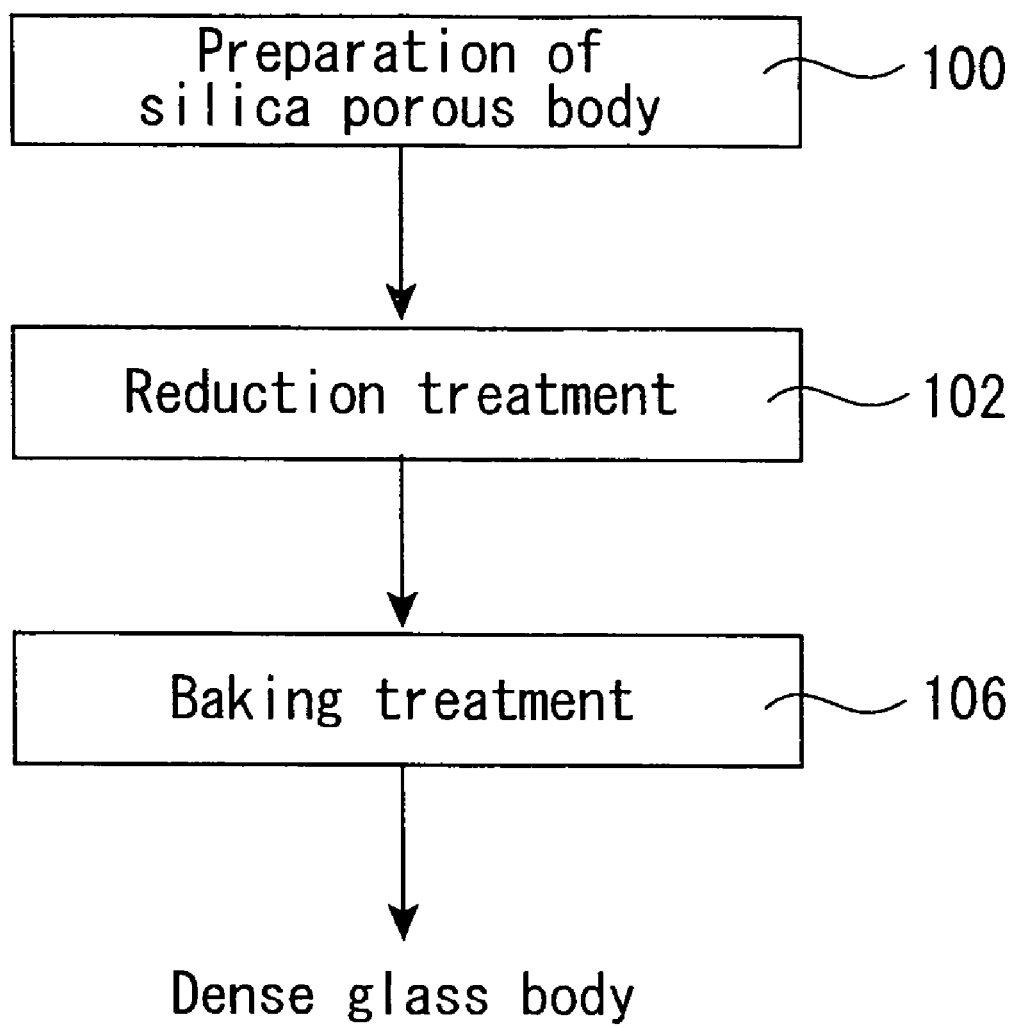
FIG. 1 is a flow chart showing an outline of the procedures of the first embodiment in the production process of a synthetic quartz glass body of the present invention.

FIG. 1 is a flow chart showing an outline of the procedures of the first embodiment in the production process of a synthetic quartz glass body of the present invention. As illustrated in FIG. 1, a dense, highly heat resistant synthetic quartz glass body can be obtained by preparing a silica porous body, preferably a hydroxyl group-containing silica porous body (step 100); carrying out a reduction treatment (step 102); and then carrying out a baking treatment (step 106).

As the foregoing silica porous body, a porous body obtained by flame hydrolysis of a silicon halide and a porous body obtained by a sol-gel process can be used.

Prior to subjecting the foregoing silica porous body to a reduction treatment (step 102), it is preferable that the subject silica porous body is preheated in a reduced pressure atmosphere in the vicinity of the reaction temperature.

The foregoing reduction treatment is not particularly limited, but a treatment in which the silica porous body is reacted in vacuo at high temperatures or a treatment in which the silica porous body is reacted with a reducing gas in an atmosphere containing the subject gas is suitable. The foregoing step 102 is preferably kept in the temperature range of from 100° C. to 1,300° C., and more preferably 500° C. or higher and 1,000° C. or lower for 30 minutes or more.

As the foregoing reducing gas, reducing gases containing carbon, nitrogen, chlorine, etc. are preferably enumerated; gases containing nitrogen and/or carbon are more preferably enumerated; and volatile silicon compounds containing nitrogen and/or carbon are especially preferably enumerated.

In the foregoing step 102, by using a volatile silicon compound containing nitrogen and/or carbon as the reaction gas, an Si—N bond or an Si—C bond is formed at the time of reaction, thereby enhancing the viscosity of the glass body after densification. Incidentally, in the case of using a volatile silicon compound as the reaction gas, a hydroxyl group-containing silica porous body is prepared in the foregoing step 100. An amount of the hydroxyl group to be contained in the foregoing silica porous body is sufficiently from 50 to 1,000 ppm.

The foregoing volatile silicon compound containing nitrogen and/or carbon is not particularly limited. Preferred examples thereof include silicon compounds containing an Si—N bond, such as silazanes and organosilazanes; silicon compounds containing an Si—O bond, such as siloxanes, organosiloxanes, alkoxysilanes, and aroxysilanes; silanes; organohalogen silanes; organosilanes; organopolysilanes; and silicone compounds. Organosilazanes such as hexamethyldisilazane and organosiloxanes such as hexamethyldisiloxane are more preferable. Especially, a reaction with an organosilazane such as hexamethyldisilazane is suitable because it mostly easily constitutes an Si—N bond and is effective for increasing the viscosity.

Specific examples of the volatile silicon compound which is used in the present invention include silazanes (for example, disilazane and trisilazane), organosilazanes (for example, hexamethyldisilazane, hexaethyldisilazane, hexaphenylsilazane, triethylsilazane, tripropylsilazane, triphenylsilazane, hexamethylcyclotrisilazane, octamethylcyclotetrasilazane, hexaethylcyclotrisilazane, octaethylcyclotetrasilazane, and hexaphenylcyclotrisilazane), organohalogen silanes (for example, fluorotrimethylsilane, chlorotrimethylsilane, trichloromethylsilane, bromotrimethylsilane, iodotrimethylsilane, methyldichlorosilane, phenyltrichlorosilane, diphenyldichlorosilane, trifluoropropyltrichlorosilane, heptadecafluorodecyltrichlorosilane, and tris (2,4-pentanediketo)silicon(IV) bromide), silicon acetate, organoacetoxysilanes (for example, acetoxytrimethylsilane), metasilicic acid, silanes (for example, monosilane, disilane, and trisilane), (ethoxycarbonylmethyl)trimethylsilane, organosilanes (for example, methylsilane, tetramethylsilane, trimethylpropylsilane, allyltrimethylsilane, dimethylsilane, tetraethylsilane, triethylsilane, and tetraphenylsilane), organopolysilanes (for example, hexamethyldisilane, hexaethyldisilane, hexapropyldisilane, hexaphenyldisilane, and octaphenylcyclotetrasilane), organosilanols (for example, trimethylsilanol and diethylsilanediol), trimethyl(trifluoromethanesulfonyloxy)silane, trimethyl(methylthio)silane, azidotrimethylsilane, cycnotrimethylsilane, (ethoxycarbonylmethyl)trimethylsilane, N,O-bis(trimethylsilyl)acetamide, siloxanes (for example, disiloxane and trisiloxane), organosiloxanes (for example, hexamethyldisiloxane, hexaethyldisiloxane, hexapropyldisiloxane, hexaphenyldisiloxane, octamethyltrisiloxane, decamethyltetrasiloxane, dodecamethylpentasiloxane, hexamethylcyclotrisiloxane, octamethylcyclotetrasiloxane, hexaphenylcyclotrisiloxane, octaphenylcyclotetrasiloxane, and octamethylspiro[5.5]pentasiloxane), alkoxysilanes (for example, tetramethoxysilane, trimethoxymethylsilane, dimethoxydimethylsilane, methoxytrimethylsilane, trimethoxyphenylsilane, dimethoxydiphenylsilane, tetraethoxysilane, triethoxymethylsilane, diethoxydimethylsilane, triethoxyphenylsilane, diethoxydiphenylsilane, trimethoxyhexylsilane, triethoxyhexylsilane, trimethoxydecylsilane, triethoxydecylsilane, trifluoropropyltrimethoxysilane, and heptadecatrifluorodecyltrimethoxysilane), aryloxysilanes (for example, trimethylphenoxysilane), organosilanecarboxylic acids (for example, trimethylsilylpropionic acid and trimethylsilylbutyric acid), organosilanethiols (for example, trimethylsilanethiol), organosilicon isocyanates (for example, trimethylsilicon isocyanate and triphenylsilicon isocyanate), organosilicon isothiocyanates (for example, trimethylsilicon isothiocyanate and phenylsilicon triisothiocyanate), organosilthianes (for example, hexamethyldisilthiane and tetramethylcyclodisilthiane), and organosilmethylenes (for example, hexamethyldisilmethylene and octamethyltrisilmethylene). The foregoing volatile silicon compound may be used singly or in combinations of two or more kinds thereof.

In the foregoing step 102, it is preferable that the reaction is carried out in a mixed gas atmosphere comprising an atmosphere containing the foregoing volatile silicon compound having ammonia added thereto.

After completion of the foregoing heating treatment, the porous body is transferred into a reduced pressure atmosphere or an inert gas or reducing gas atmosphere, kept in the temperature range of from 1,300° C. to 1,900° C. for 30 minutes or more, and subjected to a baking treatment (step 106), thereby obtaining a dense quartz glass body.

Also, after carrying out the step 100 and the step 102 in the same manners as described previously, by carrying out a vapor phase reaction in an ammonia-containing atmosphere (step 103) and then carrying out a baking treatment (step 106), it is possible to obtain a dense, highly heat resistant synthetic quartz glass body.

In the step 102, it is preferred to use a volatile silicon compound containing nitrogen and/or carbon as the reaction gas likewise the case as described previously. Incidentally, according to this progress of work, in the step 102, it is not necessary to further add ammonia to an atmosphere containing the foregoing volatile silicon compound, but it is also possible to carry out the reaction in a mixed gas atmosphere containing the foregoing volatile silicon compound and ammonia.

It is preferable that the foregoing step 103 is kept in the temperature range of from 100° C. to 1,300° C. for 30 minutes or more.

Also, in FIG. 1, while the case of carrying out the reduction treatment (step 102) and then carrying out the baking treatment (step 106) has been described, the step 102 and the step 106 may be carried out at the same time. In the case where the foregoing two steps are carried out at the same time, after carrying out the step 100 in the same manner as described previously, the reduction treatment and the baking treatment are carried out at a reaction temperature of 100° C. or higher and 1,900° C. or lower, thereby forming a dense glass body.

The quartz obtained by the production process of a synthetic quartz glass of the present invention is a synthetic quartz glass the viscosity at the time of a high temperature of which increases to an equal level to that of a natural quartz glass (namely, log η=11.7 or more at 1,280° C.), whereby the heat resistance is improved and has been confirmed to have a large absorption band in the wavelength region of about 245 nm (5.0 eV) in the measurement of a transmittance in an ultraviolet region. As shown in Examples 1-1 to 1-6 as described later and FIG. 7, it has been confirmed that there is a positive correlation between the absorption coefficient in the wavelength region of about 245 nm and the viscosity. When the synthetic quartz glass body of the present invention exhibited a viscosity of 11.7 or more at 1,280° C. in terms of log η=11.7 or more, a value of the absorption coefficient was 0.05 cm$^{-1}$ or more. The absorption coefficient k at 245 nm (5.0 eV) is a value determined according to the following expression (1), which is said to be caused due to an Si—Si bond as an oxygen deficiency in the quartz glass.

$$T=e^{-kd} \quad (1)$$

[In the foregoing expression (1), T represents an internal transmittance; and d represents a thickness (cm).]

When the foregoing reducing gas containing nitrogen, carbon, chlorine, etc. is bonded to O in the quartz glass body, a large quantity of the Si—Si bond is formed. However, when a reducing element such as nitrogen, carbon, and chlorine remains in an amount exceeding a certain value without being bonded, a marked lowering of the viscosity and the generation of bubbles are caused. Accordingly, it is required to control the nitrogen concentration, the carbon concentration, and the chlorine concentration at certain values or less, respectively.

According to the foregoing production process of the present invention, it is possible to produce the highly heat resistant synthetic quartz glass body of the present invention having an absorption coefficient at 245 nm of 0.05 cm$^{-1}$ or more and having a carbon concentration, a nitrogen concentration and a chlorine concentration to be contained of 10,000 ppm or less, respectively. The OH group concentration in the foregoing synthetic quartz glass body is preferably 30 ppm or less, and more preferably 10 ppm or less.

In the production process of a synthetic quartz glass of the present invention, an example of an embodiment using hexamethyldisilazane [(CH$_3$)$_3$Si]$_2$NH as the reducing gas to be used as the reaction gas will be described in detail.

First of all, tetrachlorosilane is hydrolyzed to accumulate silica fine particles therein, thereby preparing a silica porous body. This silica porous body is set in a quartz glass-made furnace core tube provided in an electric furnace, and the temperature is raised to a prescribed temperature. At this time, it is preferred to remove moisture adsorbed on the silica porous body by keeping the silica porous body in the vicinity of the reaction temperature for a certain period of time.

Next, a hexamethyldisilazane vapor is flown while diluting with a nitrogen gas, thereby reacting the hexamethylsilazane with the OH group bonded to the silica porous body in the prescribed temperature range. At this time, it is considered that reactions represented by the following chemical expressions (1) and (2) take place.

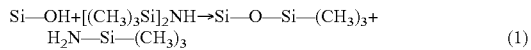

$$\text{Si—OH} + [(CH_3)_3Si]_2NH \rightarrow \text{Si—O—Si—}(CH_3)_3 + H_2N\text{—Si—}(CH_3)_3 \quad (1)$$

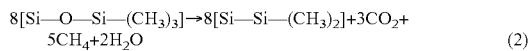

$$8[\text{Si—O—Si—}(CH_3)_3] \rightarrow 8[\text{Si—Si—}(CH_3)_2] + 3CO_2 + 5CH_4 + 2H_2O \quad (2)$$

After such reactions, large quantities of products of Si—Si, Si—N, Si—C, etc. are formed.

The quartz glass starts viscous flow in the temperature region of 900° C. or higher, and its viscosity is rapidly lowered as compared with that at the ambient temperature. The foregoing three kinds of products do not cause viscous flow and become a stopper in the quartz glass, thereby inhibiting the viscous flow of the quartz glass main body and preventing a lowering of the viscosity from occurring. At this time, the viscosity at high temperature and the absorption coefficient at 245 nm (an amount of a so-called Si—Si bond) have a positive correlation. Also, the viscosity has a weak positive correlation with the absorption coefficient at 215 nm.

The porous body after completion of the reaction is transferred into a reduced pressure atmosphere of 1×10$^{-3}$ mmHg or lower and heated for baking at 1,300° C. or higher and 1,900° C. or lower, thereby obtaining a dense, highly heat resistant synthetic quartz glass body. As described later, a transparent quartz glass body and a black quartz glass body are obtained depending upon the reaction temperature with the reaction gas or the amount of the reaction gas. In all of the cases, the H$_2$N—Si—(CH$_3$)$_3$ remaining in the porous body partly forms Si—N or Si—C, thereby contributing to an increase of the viscosity.

Next, in the production process of a quartz glass of the present invention, an example of an embodiment using hexamethyldisiloxane [(CH$_3$)$_3$Si]$_2$O as the reaction gas will be described in detail.

First of all, likewise the foregoing case using hexamethyldisilazane, a silica porous body is prepared, and a hexamethyldisiloxane vapor is then flown while diluting with a nitrogen gas, thereby reacting the hexamethyldisiloxane with the OH group bonded to the porous body. At this time, it is considered that a reaction represented by the following expression (3) takes place.

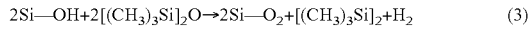

$$2\text{Si—OH} + 2[(CH_3)_3Si]_2O \rightarrow 2\text{Si—O}_2 + [(CH_3)_3Si]_2 + H_2 \quad (3)$$

The porous body after completion of the reaction is transferred into a reduced pressure atmosphere of 1×10$^{-3}$ mmHg or lower and heated for baking at 1,300° C. or higher and 1,900° C. or lower, thereby obtaining a dense, highly heat resistant synthetic quartz glass body. As described later, a transparent quartz glass body and a black quartz glass body are obtained depending upon the reaction temperature with the reaction gas or the amount of the reaction gas. In all of the cases, the [(CH$_3$)$_3$Si]$_2$ remaining in the porous body partly forms Si—C, thereby contributing to an increase of the viscosity.

In the production process of a synthetic quartz glass of the present invention, the foregoing reduction treatment is carried out at a reaction temperature of from 100° C. to 800° C., and after completion of the reaction, the porous body is subjected to evacuation under a reduced pressure in this temperature range and subsequently densified at a temperature of from 1,300 to 1,900° C., thereby obtaining a transparent quartz glass body having a nitrogen concentration to be contained of 100 ppm or less and a carbon concentration to be contained of 100 ppm or less.

In the foregoing reduction treatment, when a carbon-containing gas is used as the reaction gas and the heating temperature is about 400° C. or higher, the reaction gas (for example, a silazane gas and a siloxane gas) remaining in the porous body is decomposed, thereby generating a large amount of liberated carbon, the liberated carbon still remains in the glass body in the subsequent heating under a reduced pressure, and the resulting quartz glass is colored black, thereby obtaining a black quartz glass body having a carbon concentration to be contained exceeding 100 ppm and 10,000 ppm or less. Incidentally, blackening depends upon not only the reaction temperature of the reduction treatment but also the concentration of the reaction gas, and the amount of the reaction gas and the reaction temperature may be properly chosen according to a desired transparency.

The OH group concentration in the foregoing transparent quartz glass body and black quartz glass body is preferably 30 ppm or less, and more preferably 10 ppm or less. Also, it is preferred to control the chlorine concentration in the quartz glass body at less than 30 ppm.

Also, in the production process of a synthetic quartz glass body of the present invention, by carrying out a heating treatment (hydrogen treatment) in a hydrogen-containing atmosphere, it is possible to obtain a synthetic quartz glass body having a very excellent high-temperature viscosity characteristic.

Figure 2:
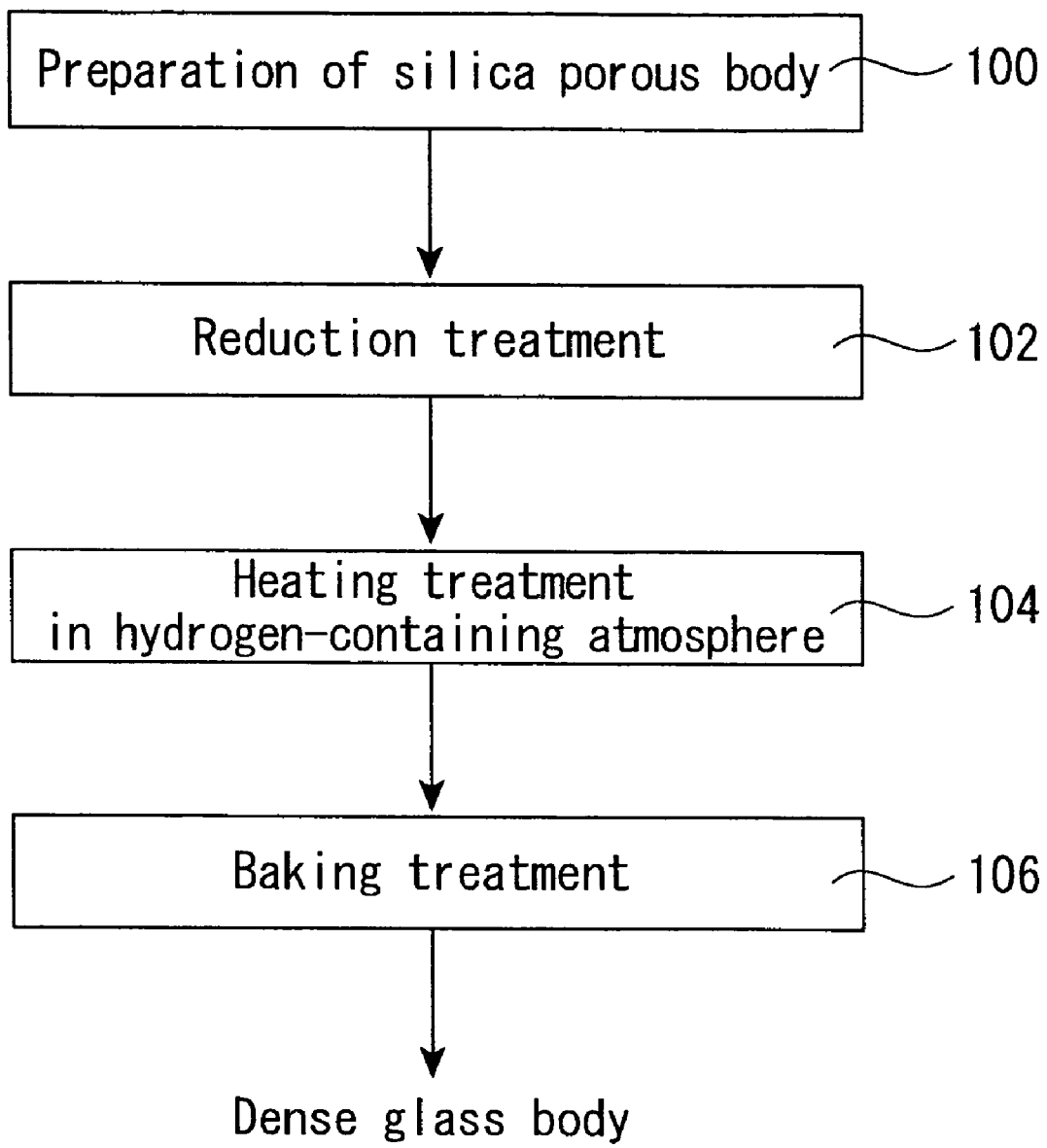
FIG. 2 is a flow chart showing an outline of the procedures of the second embodiment in the production process of a synthetic quartz glass body of the present invention.
Figure 3:
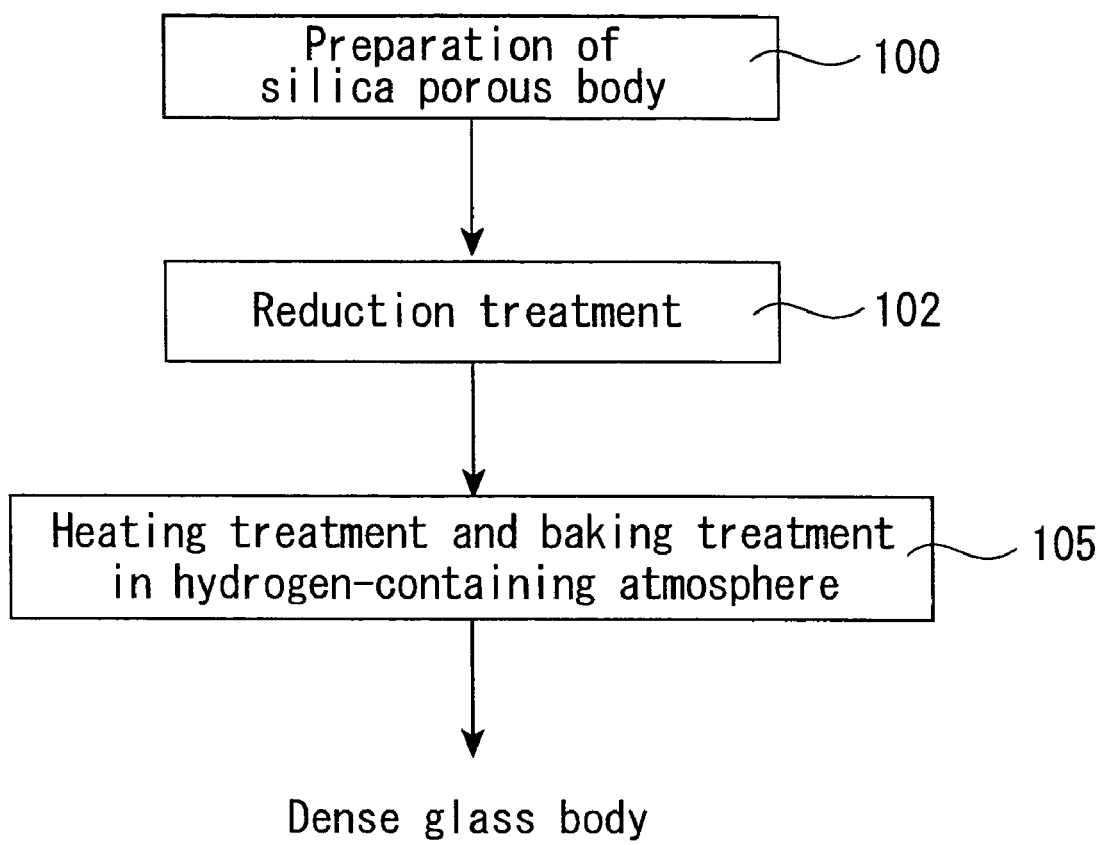
FIG. 3 is a flow chart showing an outline of the procedures of the third embodiment in the production process of a synthetic quartz glass body of the present invention.
Figure 4:
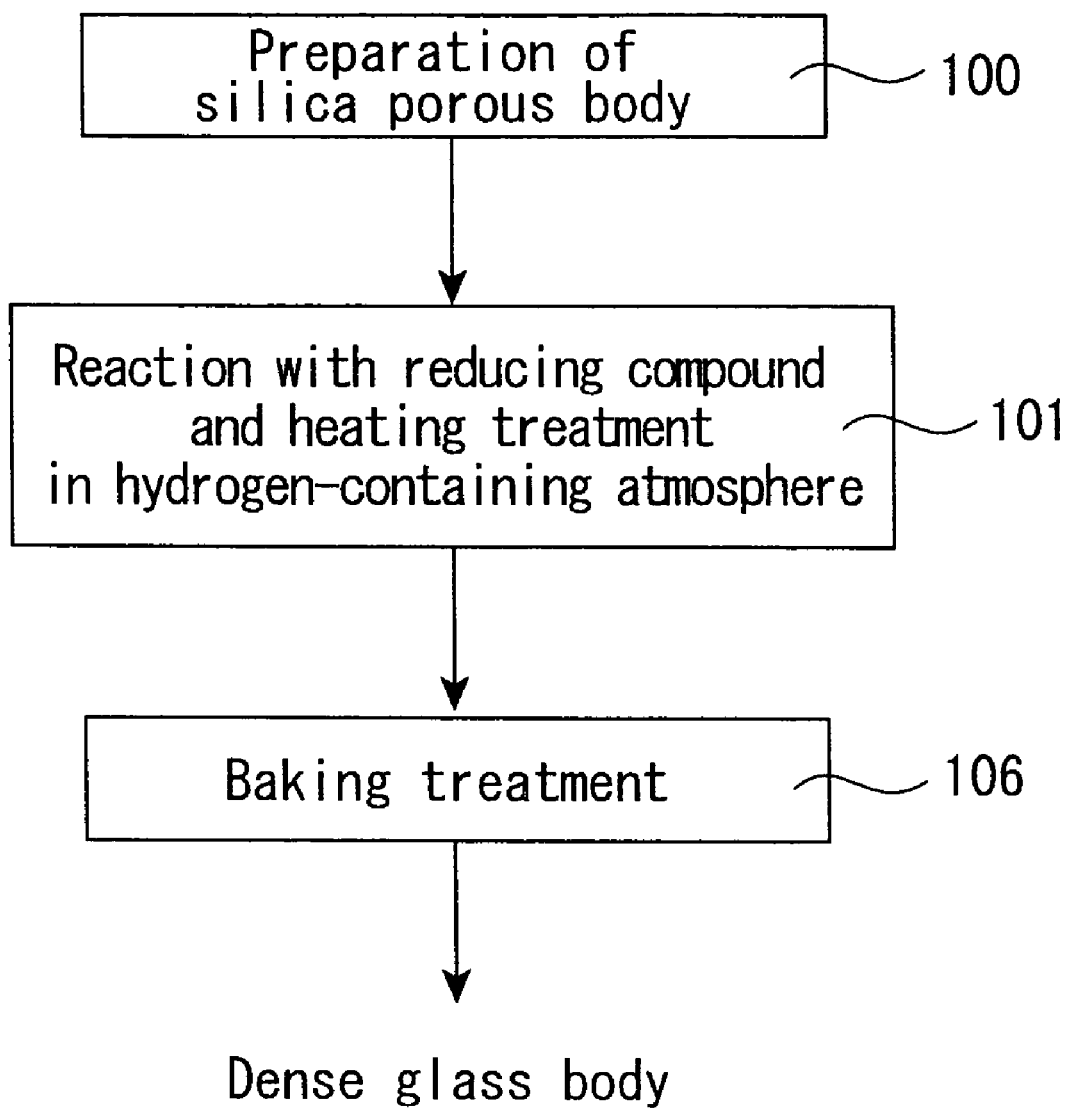
FIG. 4 is a flow chart showing an outline of the procedures of the fourth embodiment in the production process of a synthetic quartz glass body of the present invention.
Figure 5:
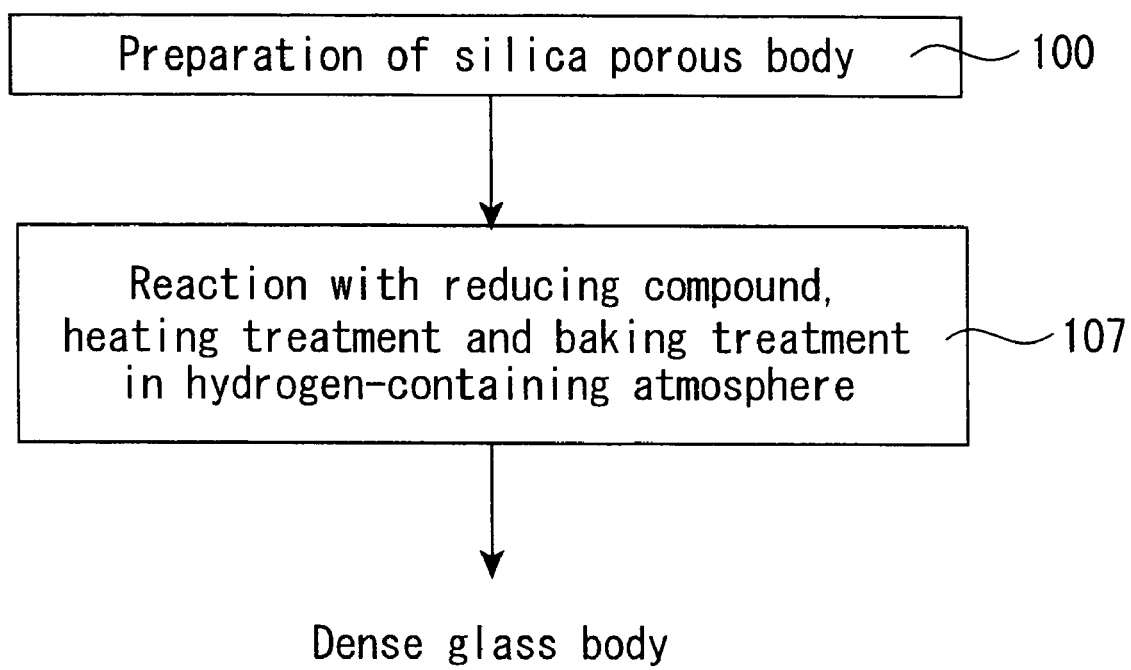
FIG. 5 is a flow chart showing an outline of the procedures of the fifth embodiment in the production process of a synthetic quartz glass body of the present invention.

FIG. 2 is a flow chart showing an outline of the procedures of the second embodiment in the production process of a highly heat resistant synthetic quartz glass body of the present invention. FIG. 3 is a flow chart showing an outline of the procedures of the third embodiment in the production process of a highly heat resistant synthetic quartz glass body of the present invention. FIG. 4 is a flow chart showing an outline of the procedures of the fourth embodiment in the production process of a highly heat resistant synthetic quartz glass body of the present invention. FIG. 5 is a flow chart showing an outline of the procedures of the fifth embodiment in the production process of a highly heat resistant synthetic quartz glass body of the present invention.

As illustrated in FIG. 2, a dense, highly heat resistant synthetic quartz glass body can be obtained by carrying out the step 100 and the step 102 in the same manners as described previously; carrying out a heating treatment in a hydrogen-containing atmosphere (step 104); and then carrying out a baking treatment (step 106).

In the step 102 of FIG. 2, it is preferred to choose the foregoing volatile silicon compound (with proviso that a halogenated silane is excluded) containing nitrogen and/or carbon as the reaction gas and subjecting the subject silicon compound to a vapor phase reaction with the hydroxyl group-containing silica porous body. When the reduction treatment is carried out in a halogenated silane-containing atmosphere, the residual halogen reacts with a hydrogen gas to form, for example, HCl or HF, whereby a hydroxyl group is formed in compensation therefor. Thus, the hydroxyl group remains, thereby lowering the viscosity of the quartz glass at the time of high temperature. Accordingly, in the case of carrying out the hydrogen treatment, it is preferred to use a volatile silicon compound exclusive of a halogenated silane.

Also, it is preferable that the foregoing step 102 is kept in the temperature range of from 100° C. to 1,000° C. for 30 minutes or more.

When the foregoing hydrogen-containing atmosphere is 100% $H_2$ or a gas capable of generating hydrogen upon decomposition, such as a mixed gas of an inert gas with an $H_2$ gas and water vapor, the same effects can be obtained. It is suitable that the step 104 is kept at the heating temperature in the range of 100° C. or higher, and more preferably 500° C. or higher and 1,300° C. or lower for 30 minutes or more.

After completion of the foregoing heating treatment, the porous body is transferred into a reduced pressure atmosphere or an inert gas or reducing gas atmosphere and kept in the temperature range of from 1,300° C. to 1,900° C. for 30 minutes or more to carry out a baking treatment (step 106), thereby obtaining a dense quartz glass body.

Also, as illustrated in FIG. 3, a dense, highly heat resistant synthetic quartz glass body can be obtained by carrying out the step 100 and the step 102 in the same manners as described previously and then carrying out a baking treatment simultaneously by a heating treatment in the foregoing hydrogen-containing atmosphere (step 105). It is preferable that the step 105 is kept at the heating temperature in the temperature range of from 1,000° C. to 1,900° C. for 30 minutes or more.

Further, as illustrated in FIG. 4, a dense, highly heat resistant synthetic quartz glass body can be obtained by carrying out the step 100 in the same manner as described previously; carrying out a vapor reaction with the foregoing reducing gas in the foregoing hydrogen-containing atmosphere (step 101); and then carrying out a baking treatment (step 106).

It is suitable that the foregoing step 101 is carried out at from 100° C. to 1,300° C. for 30 minutes or more in a mixed gas atmosphere of the foregoing hydrogen-containing atmospheric gas to which the foregoing reducing gas, preferably a volatile silicon compound (with proviso that a halogenated silane is excluded) containing nitrogen and/or carbon has been added. The step 106 may be carried out in the same manner as described previously and is preferably carried out at from 1,300° C. to 1,900° C.

Moreover, as illustrated in FIG. 5, a dense, highly heat resistant synthetic quartz glass body can be obtained by carrying out the step 100 in the same manner as described previously and then carrying out a baking treatment simultaneously by a heating treatment in a mixed gas atmosphere of the foregoing hydrogen-containing atmospheric gas to which the foregoing reducing gas, preferably a volatile silicon compound (with proviso that a halogenated silane is excluded) containing nitrogen and/or carbon has been added (step 107). It is preferable that the step 107 is kept at the heating temperature in the temperature range of from 100° C. to 1,900° C. for 30 minutes or more.

As one example of the production process of a quartz glass of the present invention, an example of an embodiment in which a hydrogen treatment is carried out using hexamethyldisilazane $[(CH_3)_3Si]_2NH$ as the reaction gas will be described below in detail.

First of all, after preparing a silica porous body in the same manner as described previously, the hydroxyl group bonded to the porous body is reacted with hexamethyldisilazane in the same manner as described previously.

The porous body after completion of the reaction is transferred into a hydrogen-containing atmosphere and heated. In this heating treatment, in the case where the heating temperature is kept in the temperature range of from 100 to 1,300° C. for 30 minutes or more, after completion of the heating treatment, the porous body is transferred into a reduced pressure atmosphere or the like and kept in the temperature range of from 1,300 to 1,900° C. for 30 minutes or more to carry out baking, thereby obtaining a dense quartz glass body. According to the foregoing process, it is possible to produce a highly heat resistant synthetic quartz glass body having a nitrogen concentration to be contained of 100 ppm or less and a carbon concentration to be contained of 100 ppm or less. Also, the hydroxyl group concentration in the foregoing synthetic quartz glass body is preferably 30 ppm or less, and more preferably 10 ppm or less; and the chlorine concentration is suitably less than 30 ppm.

Also, in the heating treatment in the hydrogen-containing atmosphere, in the case where the heating temperature is kept in the temperature range of from 1,000° C. to 1,900° C. for 30 minutes or more, it is also possible to carry out baking simultaneously by the subject heating treatment.

In all of the cases, $H_2N—Si—(CH_3)_3$ remaining in the porous body efficiently forms a large quantity of Si—N, Si—C or Si—Si by carrying out an $H_2$ treatment and contributes to an increase of the viscosity.

According to the foregoing process of the present invention, a dense, highly heat resistant synthetic quartz glass body which is free from the generation of bubbles and does not form bubbles in the electrical heating step is obtained. However, in order to obtain a highly heat resistant synthetic quartz glass body which is free from the generation of bubbles and does not form bubbles in not only the electrical heating step but also the flame heating processing step, the following process is suitably employed.

Figure 6:
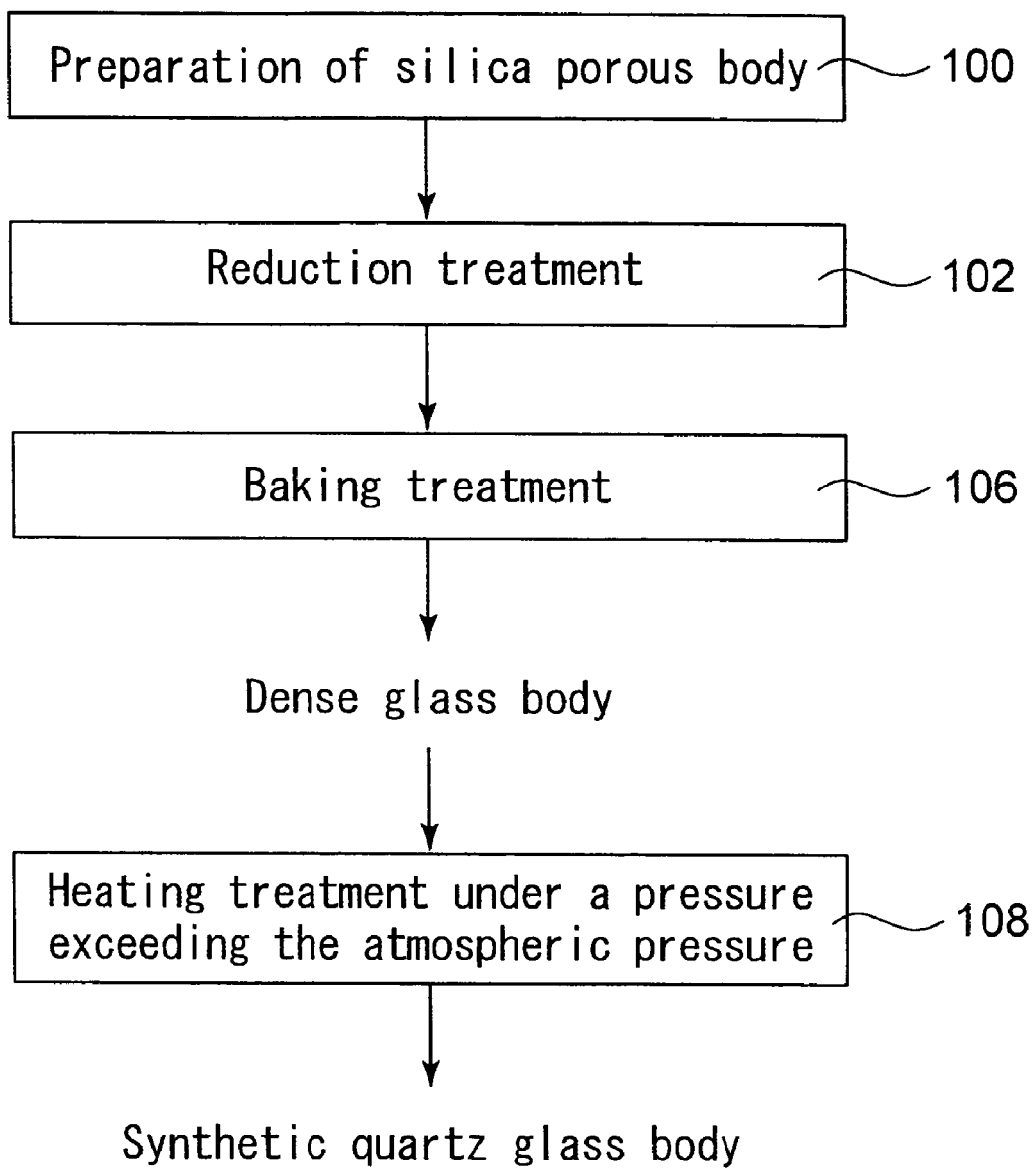
FIG. 6 is a flow chart showing an outline of the procedures of the sixth embodiment in the production process of a synthetic quartz glass body of the present invention.

FIG. 6 is a flow chart showing an outline of the procedures of the sixth embodiment in the production process of a synthetic quartz glass body of the present invention. As illustrated in FIG. 6, a highly heat resistant synthetic quartz glass body which is free from the generation of bubbles can be obtained by carrying out the step 100, the step 102 and the step 106 in the same manners as described previously to form a dense quartz glass body and then further carrying out a heating treatment in a non-oxidative atmosphere under a pressure exceeding the atmospheric pressure in the temperature range of from 1,200° C. to 1,900° C. (step 108).

In FIG. 6, it is preferable that the step 106 is kept under a reduced pressure in the temperature range of from 1,300° C. to 1,750° C. for 30 minutes or more.

The nitrogen and carbon to be contained in the reaction gas as enumerated above form Si—N and Si—C after the reaction and simultaneously make liberated nitrogen and liberated carbon remain to form a gaseous oxide at the time of forming a glass body, thereby generating bubbles. This generation of bubbles is remarkable in the case of heating at 1,750° C. or higher. Also, when heat melted by a gas flame, the liberated nitrogen or liberated carbon reacts with the flame gas or oxygen in air on the surface of the glass body, thereby similarly generating bubbles.

In order to prevent the generation of bubbles from occurring, the quartz glass body after baking is further heat treated in a non-oxidative atmosphere under a pressure exceeding the atmospheric pressure in the temperature range of from 1,200 to 1,900° C. (step 108). The non-oxidative atmosphere is preferably an inert gas, and especially, Ar is preferable because it has the highest convenience. The pressure is most preferably from 500 kg/cm$^2$ to 10,000 kg/cm$^2$ with respect to the effect. However, a pressure exceeding the atmospheric pressure and up to 10 kg/cm$^2$ is actually desired because the effect is confirmed and the production is the easiest. The treatment time may be properly chosen depending upon the pressure and temperature conditions and so on. Concretely, it is preferable that the step is kept in the foregoing temperature and pressure ranges for 30 minutes or more.

As one example of the production process of a quartz glass of the present invention, an example of an embodiment in which the dense quartz glass body is further subjected to a step 108 using hexamethyldisilazane [(CH$_3$)$_3$Si]$_2$NH as a gas to be used as the reaction gas will be described below in detail.

First of all, after preparing a silica porous body in the same manner as described previously, the hydroxyl group bonded to the porous body is reacted with hexamethyldisilazane in the same manner as described previously.

The porous body after completion of the reaction is transferred into a reduced pressure atmosphere of 1×10$^{-3}$ mmHg or lower and heated at a reaction temperature of from 1,300° C. to 1,750° C., for example, 1,600° C. The foregoing product is partly decomposed in the temperature region of 800° C. or higher to generate liberated nitrogen or liberated carbon, which further reacts with SiO$_2$ in the glass body at from approximately 1,200° C. to convert into NO$_2$ or CO$_2$, thereby forming fine air bubbles.

When the thus obtained glass body is subjected to shape deformation processing by handling at 1,750° C. or higher, the air bubbles become larger, whereby the resulting glass body is no longer useful as a product. For that reason, prior to the heating treatment at 1,750° C. or higher, the obtained glass body is pressurized at a pressure exceeding the atmospheric pressure and up to 10,000 kg/cm$^2$ in an inert atmosphere in the temperature range of from 1,200° C. to 1,900° C., thereby smashing the bubbles at the stage of fine bubbles. The smashed bubbles do not again expand. As a result, a highly heat resistant synthetic quartz glass which contains SiC or SiN contributing to an increase of the viscosity and which does not form bubbles and is free from the generation of bubbles in the temperature region of 1,750° C. or higher is obtained.

According to the foregoing process, a synthetic quartz glass body having a nitrogen concentration to be contained of 10,000 ppm or less and a carbon concentration to be contained of 10,000 ppm or less is produced. The hydroxyl group concentration in the foregoing synthetic quartz glass body is preferably 30 ppm or less, and more preferably 10 ppm or less; and the chlorine concentration is suitably less than 30 ppm.

Also, in the dense quartz glass body produced by the production process of a synthetic quartz glass of the present invention, by controlling the nitrogen concentration and the carbon concentration on the surface in the subject quartz glass body in the range of 50 ppm or less, and more preferably 20 ppm or less, respectively, it is possible to provide a quartz glass body which is free from the generation of bubbles even by carrying out not only electrical melt heating but also a flame melt heating step.

As one example of the foregoing production process of a quartz glass, an example of an embodiment using hexamethyldisilazane [(CH$_3$)$_3$Si]$_2$NH as a gas to be used as the reaction gas will be described below in detail.

In a furnace core tube in which a silica porous body containing 200 ppm of an OH group and having a total OH group weight of 1.0 g is set in a weight of 5 kg, 9.5 g of a hexamethyldisilazane vapor is flown while diluting with a nitrogen gas, thereby reacting the OH group bonded to the porous body with hexamethyldisilazane at a reaction temperature of from 100° C. to 1,300° C., for example, 500° C. At this time, it is considered that the reactions represented by the foregoing expressions (1) and (2) take place.

At this time, when the amount of the silazane to be thrown is insufficient, the silazane is consumed in the surface portion, and the OH group remains in the inside. When the amount is proper as in the foregoing example (specifically, the volatile silicon compound in a molar number of from 0.1 to 3 times the molar number of the hydroxyl group contained in the silica porous body), a transparent quartz glass body in which no OH group is present in the whole of the quartz glass after sintering and the nitrogen concentration and the carbon concentration are 50 ppm or less, respectively is obtained. When the amount is large, the unreacted silazane remains as a carbon compound in the inside of the porous body, and the inside of the subject quartz glass body is blackened.

For example, by using a volatile silicon compound in a molar number of from 2 to 10 times the molar number of the hydroxyl group contained in the silica porous body, a quartz glass body having a transparent portion having concentrations of nitrogen and carbon in the range of 50 ppm or less, respectively and a black portion having a concentration of carbon in the range of from 100 to 10,000 ppm is obtained. Also, a black portion is skived out from the resulting quartz glass body to obtain a black quartz glass body. Incidentally, blackening depends upon the reaction temperature, and the amount of the volatile silicon compound and the reaction temperature may be properly chosen according to a desired transparency.

As a result, a bubble-free synthetic quartz glass body which contains SiC or SiN contributing to an increase of the viscosity and which is free from the generation of bubbles especially in the processing molding step in the temperature region of 1,750° C. or higher is obtained.

Also, by adjusting the amount of the volatile silicon compound to be thrown such as a silazane, a synthetic quartz glass having an OH group-containing portion or a black portion in the inside is obtained.

When a halogen-containing volatile silicon compound such as trichloromethylsilane is used in place of the hexamethyldisilazane, it is possible to easily prepare a quartz member having a special function, which contains a halogen element such as chlorine on the outer surface and an OH group in the inside.

EXAMPLES

The present invention will be described below in more detail with reference to the Examples, but these Examples are shown for the illustrative purpose. Needless to say, it should not be construed that the present invention is limited thereto.

Example 1-1

About 1 kg of a porous synthetic quartz glass body (OH group content: about 300 ppm) in a column form having a diameter of 100 mm as obtained by flame hydrolysis of tetrachlorosilane was set in a quartz glass-made furnace core tube (diameter: 200 mm) installed in an electric furnace.

Next, the inside of the furnace core tube was evacuated, heated at 500° C., and preheated at that temperature for 60 minutes.

Thereafter, the temperature was raised to the reaction temperature, and a hexamethyldisilazane vapor was fed as a reaction gas while diluting with an $N_2$ gas, thereby reacting with the OH group in the porous synthetic quartz glass body. The heating was carried out at the reaction temperature shown in Table 1 while keeping that temperature for a reaction time as expressed therein. Incidentally, the supplying rate shown in the following table is shown in terms of a flow rate of the $N_2$ gas containing the reaction gas.

After completion of the reaction, the treated porous synthetic quartz glass body was transferred into a vacuum furnace, the temperature was raised to 800° C., and the pressure was reduced to $1 \times 10^{-3}$ mmHg or lower. After keeping for one hour, the temperature was further raised to 1,600° C., thereby obtaining a densified synthetic quartz glass.

TABLE 1

|  | Reaction gas | Reaction temperature (° C.) | Supplying rate (mol/hr) | Reaction time (hrs) |
|---|---|---|---|---|
| Example 1-1 | Hexamethyldisilazane | 500 | 1.0 | 3 |
| Example 1-2 | Hexamethyldisilazane | 500 | 0.5 | 3 |
| Example 1-3 | Trichloromethylsilane | 500 | 1.0 | 3 |
| Example 1-4 | Ammonia | 500 | 1.0 | 3 |
| Example 1-5 | Ethanol | 500 | 1.0 | 3 |
| Example 1-6 | Chlorine | 500 | 0.5 | 3 |
| Experimental Example 1-1 | Chlorine | 700 | 1.0 | 3 |
| Experimental Example 1-2 | Hexamethyldisilazane | 1100 | 3.0 | 3 |
| Experimental Example 1-3 | Nitrogen | 500 | 1.0 | 3 |

Examples 1-2 to 1-6

An experiment was carried out in the same manner as in Example 1-1, except for changing the reaction between a porous body and a reaction gas as shown in Table 1, thereby obtaining densified synthetic quartz glasses.

Experimental Examples 1-1 to 1-4

As Experimental Example 1-1, a dehydration reaction was carried out using a conventional chlorine gas as the reaction gas. In Experimental Example 1-2, a dehydration reaction was carried out at a high temperature and at a high concentration using hexamethyldisilazane. Experimental Example 1-3 is one in which baking of the porous synthetic quartz glass body was carried out in a nitrogen atmosphere. Other treatment conditions are the same as in Experimental Example 1-1 and shown in Table 1. Incidentally, Experimental Example 1-4 is one in which a natural quartz crystal was converted into a quartz glass upon melting by an oxyhydrogen flame.

Figure 7:
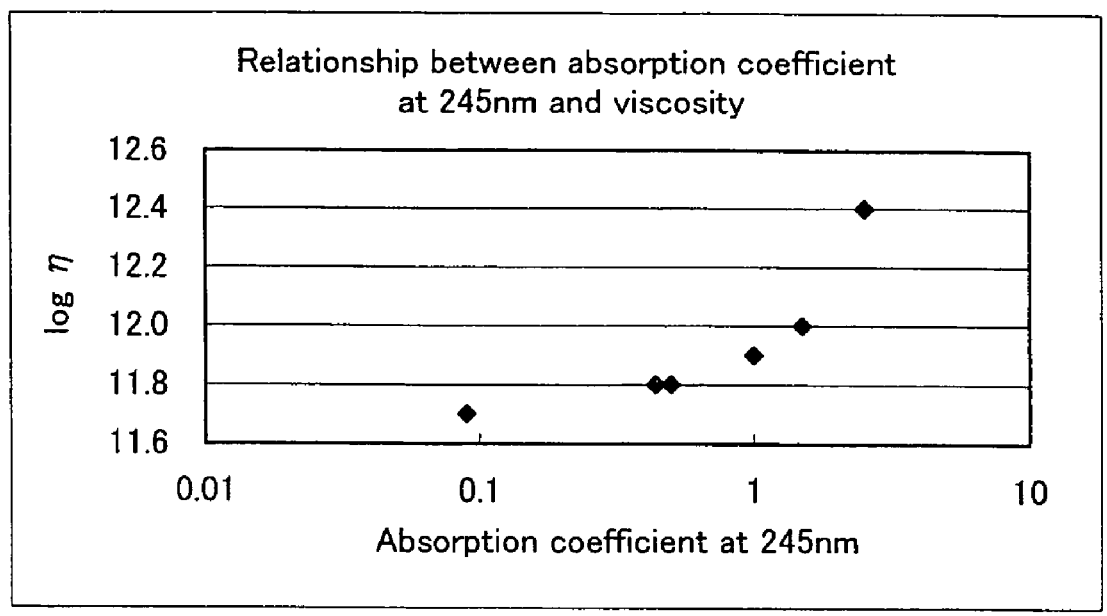
FIG. 7 is a graph showing the relationship between the absorption coefficient at 245 nm and the viscosity in Examples 1-1 to 1-6, in which a logarithmic value (log η) of the viscosity is plotted against a logarithm of the absorption coefficient.

The OH group and chlorine remaining in the foregoing synthetic quartz glasses obtained in Examples 1-1 to 1-6 and Experimental Examples 1-1 to 1-4 were measured by the infrared spectroscopic analysis and the nephelometric chlorine analysis, respectively, and carbon and nitrogen were measured by the combustion-infrared absorption analysis and the water vapor distillation-neutralization titration analysis, respectively. Further, the synthetic quartz glass was heated at 1,280° C., and its viscosity at that temperature was measured by the beam bending method. Moreover, the absorption coefficient at 245 nm was measured by a transmittance analyzer in the ultraviolet region. The viscosity was shown in terms of its logarithmic value ($\log \eta$) in Table 2. These results are summarized and shown in Table 2. The relationship between the absorption coefficient at 245 nm and the viscosity in Examples 1-1 to 1-6 is shown in FIG. 7.

TABLE 2

|  | Hydroxyl group concentration (ppm) | Chlorine concentration (ppm) | Carbon concentration (ppm) | Nitrogen concentration (ppm) | Viscosity at 1280° C. ($\log \eta$) | Absorption coefficient (245 nm) |
|---|---|---|---|---|---|---|
| Example 1-1 | <1 | <30 | 100 | 80 | 12.4 | 2.510 |
| Example 1-2 | <1 | <30 | 100 | 100 | 11.8 | 0.500 |
| Example 1-3 | <1 | 400 | 400 | 10 | 11.9 | 1.000 |
| Example 1-4 | <1 | <30 | 10 | 520 | 12.0 | 1.500 |
| Example 1-5 | <1 | <30 | 1000 | 10 | 11.8 | 0.440 |
| Example 1-6 | <1 | 1000 | 60 | 10 | 11.7 | 0.090 |
| Experimental Example 1-1 | <1 | 2300 | 10 | 10 | 11.6 | 0.100 |
| Experimental Example 1-2 | <1 | <30 | 2800 | 3000 | 11.7 | 2.480 |
| Experimental Example 1-3 | 250 | <30 | 10 | 10 | 11.5 | 0.000 |
| Experimental Example 1-4 (Natural article) | 170 | <30 | 10 | 10 | 11.9 | 0.000 |

All of the synthetic quartz glasses obtained in Examples 1-1 to 1-6 had a viscosity at the time of high temperature substantially the same as the viscosity of the natural quartz glass made of a natural quartz crystal as the raw material (Experimental Example 4) and were hardly deformed even in the high-temperature environment. These numerical values of the viscosity exhibited a positive correlation with the absorption coefficient at 245 nm. In particular, when the absorption coefficient was taken in terms of a logarithm, there was exhibited a positive correlation (FIG. 7).

On the other hand, though the synthetic quartz glass obtained in Experimental Example 1-1 had an absorption coefficient at 245 nm of 0.100, it had a chlorine concentration of 2,300 ppm and exhibited a low value of the viscosity at the time of high temperature. The synthetic quartz glass obtained in Experimental Example 1-3 exhibited an explicitly low value of the viscosity at the time of high temperature as compared with the natural quartz glass and had an absorption coefficient at 245 nm of substantially zero.

Examples 2-1 to 2-4

An experiment was carried out in the same manner as in Example 1-1, except for changing the reaction between a porous body and a reaction gas as shown in Table 3, thereby obtaining densified synthetic quartz glasses.

TABLE 3

| | Reaction gas | Reaction temperature (° C.) | Supplying rate (mol/hr) | Reaction time (hrs) |
| --- | --- | --- | --- | --- |
| Example 2-1 | Hexamethyldisilazane | 300 | 1.0 | 3 |
| Example 2-2 | Hexamethyldisilazane | 500 | 1.1 | 3 |
| Example 2-3 | Hexamethyldisilazane | 700 | 0.9 | 3 |
| Example 2-4 | Hexamethyldisilazane | 1000 | 1.1 | 3 |
| Experimental Example 2-1 | Chlorine | 700 | 1.0 | 3 |
| Experimental Example 2-2 | Trichloromethylsilane | 500 | 1.0 | 3 |
| Experimental Example 2-3 | Nitrogen | 500 | 1.0 | 3 |

Experimental Examples 2-1 to 2-3

As Experimental Example 2-1, a dehydration reaction was carried out using a conventional chlorine gas as the reaction gas. As Experimental Example 2-2, a dehydration reaction was carried out using trichloromethylsilane as the reaction gas. Experimental Example 2-3 is one in which baking of the porous body was carried out in an $N_2$ atmosphere without using the reaction gas. Densified quartz glasses were obtained under the same treatment conditions as in Examples 2-1 to 2-4, except for changing the reaction between the porous body and the reaction gas as shown in Table 3.

As a natural article, one in which a natural quartz crystal was converted into a quartz glass upon melting by an oxyhydrogen flame was used.

The hydroxyl group concentration, chlorine concentration, carbon concentration and nitrogen concentration remaining in the resulting quartz glass and the viscosity at 1,280° C. were measured in the same manners as in Example 1-1. Also, the color of the quartz glass was visually discriminated. The results obtained are shown in Table 4. Incidentally, in Table 4, the viscosity was shown in terms of its logarithmic value (log $\eta$).

TABLE 4

| | Hydroxyl group concentration (ppm) | Chlorine concentration (ppm) | Carbon concentration (ppm) | Nitrogen concentration (ppm) | Viscosity at 1280° C. (log $\eta$) | Color |
| --- | --- | --- | --- | --- | --- | --- |
| Example 2-1 | <1 | <30 | 40 | 50 | 12.1 | Transparent |
| Example 2-2 | <1 | <30 | 100 | 80 | 12.4 | Transparent |
| Example 2-3 | <1 | <30 | 200 | 100 | 12.3 | Transparent |
| Example 2-4 | <1 | <30 | 1500 | 220 | 12.3 | Black |
| Experimental Example 2-1 | <1 | 2300 | 10 | 10 | 11.6 | Transparent |
| Experimental Example 2-2 | <1 | 500 | 40 | 10 | 11.9 | Transparent |
| Experimental Example 2-3 | 250 | <30 | 10 | 10 | 11.5 | Transparent |
| Natural article | 170 | <30 | 10 | 10 | 11.9 | Transparent |

As shown in Table 4, all of the quartz glasses obtained in Examples 2-1 to 2-4 had a viscosity at the time of high temperature higher than the viscosity of the natural quartz made of a natural quartz crystal as the raw material and were hardly deformed even in the high-temperature environment. On the other hand, though the quartz glass of Experimental Example 2-1 was thoroughly dehydrated, it had a high residual concentration of chlorine; and though the quartz glass of Experimental Example 2-2 was thoroughly dehydrated, it was confirmed to have a residual concentration of chlorine of several hundreds ppm. In the quartz glass of Experimental Example 2-3, the hydroxyl group remained due to baking in vacuo, the amount of which was, however, slightly lowered. The viscosities at the time of high temperature of the quartz glasses obtained in Experimental Examples 2-1 to 2-3 exhibited a value approximately the same as or lower than that of the natural quartz. Also, as shown in Table 4, transparent quartz glass bodies were obtained at a reaction temperature of 300° C. (Example 2-1), 500° C. (Example 2-2) and 700° C. (Example 2-3), respectively; and a black quartz glass body was obtained at a reaction temperature of 1,000°

C. (Example 2-4). Also, in Examples 2-1 to 2-6, the absorption coefficient at 245 nm was measured in the same manner as in Example 1-1. As a result, in all of these Examples, an absorption coefficient of 0.05 cm$^{-1}$ or more was obtained.

Examples 3-1 to 3-11

An experiment was carried out in the same manner as in Example 1-1, except for changing the reaction between a porous body and a reaction gas as shown in Table 5, thereby obtaining densified synthetic quartz glasses.

TABLE 5

|  | Reaction gas | Reaction temperature (° C.) | Feed rate (mol/hr) | Reaction time (hrs) |
|---|---|---|---|---|
| Example 3-1 | Hexamethyldisiloxane | 300 | 1.0 | 3 |
| Example 3-2 | Hexamethyldisiloxane | 500 | 1.1 | 3 |
| Example 3-3 | Hexamethyldisiloxane | 700 | 0.9 | 3 |
| Example 3-4 | Hexamethyldisiloxane | 1000 | 1.1 | 3 |
| Example 3-5 | Tetramethoxysilane | 700 | 1.1 | 3 |
| Example 3-6 | Trimethoxymethylsilane | 700 | 1.1 | 3 |
| Example 3-7 | Trimethylpropylsilane | 700 | 1.1 | 3 |
| Example 3-8 | Trimethylsilylbutyric acid | 700 | 1.1 | 3 |
| Example 3-9 | Hexamethyldisilmethylene | 700 | 1.1 | 3 |
| Example 3-10 | Triethylsilane | 700 | 1.1 | 3 |
| Example 3-11 | Hexamethyldisilane | 700 | 1.1 | 3 |

TABLE 5-continued

|  | Reaction gas | Reaction temperature (° C.) | Feed rate (mol/hr) | Reaction time (hrs) |
|---|---|---|---|---|
| Experimental Example 3-1 | Chlorine | 700 | 1.0 | 3 |
| Experimental Example 3-2 | Ammonia | 700 | 1.0 | 3 |
| Experimental Example 3-3 | Nitrogen | 700 | 1.0 | 3 |

Experimental Examples 3-1 to 3-3

As Experimental Example 3-1, a dehydration reaction was carried out using a conventional chlorine gas as the reaction gas. In Experimental Example 3-2, a dehydration reaction was carried out using an ammonia gas as the reaction gas. Experimental Example 3-3 is one in which baking of the porous body was carried out in an N$_2$ gas atmosphere without using the reaction gas. Densified quartz glass bodies were obtained under the same treatment conditions as in Examples 3-1 to 3-11, except for changing the reaction between the porous body and the reaction gas as shown in Table 5.

As a natural article, one in which a natural quartz crystal was converted into a quartz glass upon melting by an oxyhydrogen flame was used.

The hydroxyl group concentration, chlorine concentration, carbon concentration and nitrogen concentration remaining in the resulting quartz glass and the viscosity at 1,280° C. were measured in the same manners as in Example 1-1. Also, the color of the quartz glass was visually discriminated. The results obtained are shown in Table 6. Incidentally, in Table 6, the viscosity was shown in terms of its logarithmic value (log η).

TABLE 6

|  | Hydroxyl group concentration (ppm) | Chlorine concentration (ppm) | Carbon concentration (ppm) | Nitrogen concentration (ppm) | Viscosity at 1280° C. (log η) | Color |
|---|---|---|---|---|---|---|
| Example 3-1 | <1 | <30 | 40 | 50 | 12.1 | Transparent |
| Example 3-2 | <1 | <30 | 100 | 80 | 12.2 | Transparent |
| Example 3-3 | <1 | <30 | 200 | 100 | 12.3 | Transparent |
| Example 3-4 | <1 | <30 | 1500 | 220 | 12.3 | Black |
| Example 3-5 | <1 | <30 | 200 | 100 | 12.3 | Transparent |
| Example 3-6 | <1 | <30 | 200 | 100 | 12.3 | Transparent |
| Example 3-7 | <1 | <30 | 200 | 100 | 12.3 | Transparent |
| Example 3-8 | <1 | <30 | 200 | 100 | 12.3 | Transparent |
| Example 3-9 | <1 | <30 | 200 | 100 | 12.3 | Transparent |
| Example 3-10 | <1 | <30 | 200 | 100 | 12.3 | Transparent |
| Example 3-11 | <1 | <30 | 200 | 100 | 12.3 | Transparent |
| Experimental Example 3-1 | <1 | 2300 | 10 | 10 | 11.6 | Transparent |
| Experimental Example 3-2 | <1 | <30 | 10 | 1000 | 12.0 | Transparent |
| Experimental Example 3-3 | 100 | <30 | 10 | 10 | 11.5 | Transparent |
| Natural article | 170 | <30 | 10 | 10 | 11.9 | Transparent |

As shown in Table 6, all of the quartz glasses obtained in Examples 3-1 to 3-11 had a viscosity at the time of high temperature higher than the viscosity of the natural quartz made of a natural quartz crystal as the raw material and were hardly deformed even in the high-temperature environment. On the other hand, though the quartz glass of Experimental Example 3-1 was thoroughly dehydrated, it had a high residual concentration of chlorine; in the quartz glass of Experimental Example 3-2, a number of air bubbles were generated; and in the quartz glass of Experimental Example 3-3, OH remained due to baking in vacuo, the amount of which was, however, slightly lowered. The viscosities at the time of high temperature of the quartz glasses obtained in Experimental Examples 3-1 to 3-3 exhibited a value approximately the same as or lower than that of the natural quartz. Also, transparent quartz glass bodies were in Examples 3-1 to 3-3 and 3-5 to 3-11; and a black quartz glass body was obtained in Example 3-4. Also, in Examples 3-1 to 3-11, the absorption coefficient at 245 nm was measured in the same manner as in Example 1-1. As a result, in all of these Examples, an absorption coefficient of 0.05 cm$^{-1}$ or more was obtained.

Example 4-1

An experiment was carried out in the same manner as in Example 1-1, except for changing the reaction between a porous body and a reaction gas as shown in Table 7(a), thereby achieving the reaction of the porous body and the reaction gas. Thereafter, the treated porous body was transferred into a heating furnace, and the temperature was raised to 800° C. and kept for one hour while flowing 1 mole/hr of an H$_2$ gas. Thereafter, the pressure was reduced to 1×10$^{-3}$ mmHg or lower, and the temperature was raised to 1,500° C. and kept for one hour, followed by cooling to room temperature. There was thus obtained a densified transparent quartz glass.

TABLE 7

(a)

| | Reaction gas | Reaction temperature (° C.) | Supplying rate (mol/hr) | Reaction time (hrs) |
|---|---|---|---|---|
| Example 4-1 | Hexamethyldisilazane | 500 | 1.1 | 3 |
| Example 4-2 | Hexamethyldisiloxane | 500 | 1.1 | 3 |
| Example 4-3 | Hexamethyldisilazane | 500 | 1.1 | 3 |
| Experimental Example 4-1 | Chlorine | 700 | 1.0 | 3 |
| Experimental Example 4-2 | Trichloromethylsilane | 500 | 1.1 | 3 |
| Experimental Example 4-3 | Nitrogen | 500 | 1.0 | 3 |
| Experimental Example 4-4 | Hexamethyldisilazane | 500 | 1.1 | 3 |

(b)

| | H$_2$ treatment | | |
|---|---|---|---|
| | Temperature (° C.) | Time (hrs) | Flow rate (mol/hr) |
| Example 4-1 | 800 | 1 | 1.0 |
| Example 4-2 | 800 | 1 | 1.0 |
| Example 4-3 | 1500 | 1 | 1.0 |
| Experimental Example 4-1 | — | — | — |
| Experimental Example 4-2 | 800 | 1 | 1.0 |
| Experimental Example 4-3 | 800 | 1 | 1.0 |
| Experimental Example 4-4 | — | — | — |

Example 4-2

As shown in Table 7, the experiment was carried out in the same manner as in Example 4-1, except for using hexamethyldisiloxane as the reaction gas in place of the hexamethyldisilazane vapor, thereby obtaining a densified transparent quartz glass.

Example 4-3

As shown in Table 7, a porous body was reacted with a hexamethyldisilazane vapor in the same procedures as in Example 4-1, and the treated porous body was transferred into a heating furnace. The temperature was raised to 1,500° C. and kept for one hour while flowing 1 mole/hr of an H$_2$ gas, followed by cooling to room temperature. There was thus obtained a densified transparent quartz glass.

Experimental Example 4-1

As Experimental Example 4-1, a dehydration reaction was carried out using a conventional chlorine gas as the reaction gas. A quartz glass body was obtained under the same treatment conditions as in Example 4-1, except that the reaction between the porous body and the reaction gas was carried out as shown in Table 7 and that the treatment with an H$_2$ gas was not carried out.

Experimental Example 4-2

Experimental Example 4-2 is one in which a dehydration reaction was carried out using a trichloromethylsilane gas as the reaction gas. A quartz glass body was obtained under the same treatment conditions as in Example 4-1, except for carrying out the reaction between the porous body and the reaction gas as shown in Table 7.

Experimental Example 4-3

Experimental Example 4-3 is one in which baking of the porous body was carried out in a nitrogen atmosphere without using the reaction gas. Other treatment conditions are the same as in Example 4-1 and are shown in Table 7.

Experimental Example 4-4

As shown in Table 7, after reacting with the reaction gas in the same procedures as in Example 4-2, the treated porous body was transferred into a vacuum furnace, and the temperature was raised to 800° C. Thereafter, the pressure was reduced to 1×10$^{-3}$ mmHg or lower, and the temperature was further raised to 1,500° C. and kept for one hour, followed by cooling to room temperature. There was thus obtained a densified transparent quartz glass.

Experimental Example 4-5

As Experimental Example 4-5, a quartz glass prepared by melting a natural quartz crystal by an oxyhydrogen flame was used.

The hydroxyl group concentration, chlorine concentration, carbon concentration and nitrogen concentration remaining in the resulting quartz glass and the viscosity at 1,280° C. were measured in the same manners as in Example 1-1. The results obtained are shown in Table 8. Incidentally, in Table 8, the viscosity was shown in terms of its logarithmic value (log η).

TABLE 8

|  | Hydroxyl group concentration (ppm) | Chlorine concentration (ppm) | Carbon concentration (ppm) | Nitrogen concentration (ppm) | Viscosity at 1280° C. (log η) |
|---|---|---|---|---|---|
| Example 4-1 | <1 | <30 | 20 | 8 | 12.6 |
| Example 4-2 | <1 | <30 | 30 | 1 | 12.6 |
| Example 4-3 | <1 | <30 | 10 | 7 | 12.6 |
| Experimental Example 4-1 | <1 | 2300 | 10 | 10 | 11.6 |
| Experimental Example 4-2 | 135 | <30 | 10 | 6 | 11.6 |
| Experimental Example 4-3 | 100 | <30 | 30 | 4 | 11.6 |
| Experimental Example 4-4 | <1 | <30 | 100 | 80 | 12.4 |
| Experimental Example 4-5 (Natural article) | 170 | <30 | 10 | 10 | 11.9 |

All of the quartz glasses obtained in Examples 4-1 to 4-3 had a viscosity at the time of high temperature explicitly higher than the viscosity of the natural quartz made of a natural quartz crystal as the raw material and were hardly deformed even in the high-temperature environment. On the other hand, though the quartz glass of Experimental Example 4-1 was thoroughly dehydrated, it had a high residual concentration of chlorine; and in the quartz glasses of Experimental Examples 4-2 and 4-3, OH remained. The viscosities at the time of high temperature of the quartz glasses obtained in Experimental Examples 4-1 and 4-2 exhibited a value lower than that of the natural quartz. The viscosity at the time of high temperature of the quartz glass obtained in Experimental Example 4-4 exhibited a value lower than those of the quartz glasses obtained in Examples 4-1 to 4-3. Also, in Examples 4-1 to 4-3, the absorption coefficient at 245 nm was measured in the same manner as in Example 1-1. As a result, in all of these Examples, an absorption coefficient of 0.05 cm$^{-1}$ or more was obtained.

Also, in all of the case where the reaction and heating treatment were carried out in a mixed gas atmosphere of a hexamethyldisilazane vapor and an H$_2$ gas and the baking treatment was then carried out under a reduced pressure and the case where the reaction, the heating treatment and baking treatment were carried out in a mixed gas atmosphere of a hexamethyldisilazane vapor and an H$_2$ gas, synthetic quartz glasses having a viscosity at the time of high temperature higher than the viscosity of the natural quartz made of a natural quartz crystal as the raw material were obtained likewise Examples 4-1 to 4-3.

Example 5-1

An experiment was carried out in the same manner as in Example 1-1, except for changing the reaction between a porous body and a reaction gas as shown in Table 9, thereby obtaining a densified synthetic quartz glass. Thereafter, the quartz glass body was transferred into a pressure furnace. In an Ar atmosphere, the temperature was raised to 1,400° C. at 100° C./hr, and at the same time, the pressure was raised to 1,000 kg/cm$^2$. After keeping for 2 hours, the system was cooled to room temperature and simultaneously returned to the atmospheric pressure, and the quartz glass body was taken out. The resulting quartz glass body was provided for the measurements.

Example 5-2

An experiment was carried out in the same manner as in Example 5-1, except for changing the reaction gas condition as shown in Table 9, thereby obtaining a densified quartz glass body.

Example 5-3

An experiment was carried out in the same manner as in Example 5-1, except for changing the pressurizing treatment condition against the densified quartz glass body as shown in Table 9, thereby obtaining a densified quartz glass body.

Example 5-4

As shown in Table 9, after reacting a porous body and a hexamethyldisilazane vapor in the same procedures as in Example 5-1, an ammonia gas and an N$_2$ gas were fed at a flow rate of 1 mole/hr, respectively, thereby carrying out the treatment at 500° C. for 3 hours. After completion of the reaction, a baking treatment was carried out in the same manner as in Example 1, and a pressurizing treatment was then carried out under the condition as shown in Table 9, thereby obtaining a densified quartz glass body.

Example 5-5

An experiment was carried out in the same manner as in Example 5-1, except that in addition to the hexamethyldisilazane vapor by the N$_2$ gas, 1 mole/hr of an ammonia gas was fed as the reaction gas and mixed as shown in Table 9, thereby obtaining a densified quartz glass body.

Example 5-6

An experiment was carried out in the same manner as in Example 5-1, except that a hexamethyldisiloxane gas was used as the reaction gas in place of the hexamethyldisilazane vapor as shown in Table 9, thereby obtaining a densified quartz glass body.

Example 5-7

An experiment was carried out in the same manner as in Example 5-1, except that a trichloromethylsilane gas was used as the reaction gas in place of the hexamethyldisilazane vapor as shown in Table 9, thereby obtaining a densified quartz glass body.

Experimental Examples 5-1 to 5-5

As Experimental Example 5-1, a dehydration reaction was carried out using a conventional chlorine gas as the reaction gas. In Experimental Example 5-2, a dehydration reaction was carried out using ammonia as the reaction gas. In Experimental Examples 5-3 and 5-4, a dehydration reaction was carried out using hexamethyldisilazane as the reaction gas. Experimental Example 5-5 is one in which baking of the porous body was carried out without using the reaction gas. Densified quartz glasses were obtained under the same treatment conditions as in Example 5-1, except that the reaction between the porous body and the reaction gas was carried out as shown in Table 9 and that after baking, the pressurizing treatment was not carried out.

Experimental Example 5-6

As Experimental Example 5-6, a quartz glass prepared by melting a natural quartz crystal by an oxyhydrogen flame was used.

TABLE 9

(a)

| | | Reduction treatment | | | |
|---|---|---|---|---|---|
| | Reaction gas | Reaction temperature (° C.) | Supplying rate (mol/hr) | Reaction time (hrs) | Ammonia treatment |
| Example 5-1 | Hexamethyldisilazane | 500 | 1.0 | 3.0 | — |
| Example 5-2 | Hexamethyldisilazane | 800 | 1.0 | 3.0 | — |
| Example 5-3 | Hexamethyldisilazane | 500 | 1.0 | 3.0 | — |
| Example 5-4 | Hexamethyldisilazane | 500 | 1.0 | 3.0 | 500° C. 3 hours |
| Example 5-5 | Hexamethyldisilazane + ammonia | 500 | 1.0 | 3.0 | — |
| Example 5-6 | Hexamethyldisiloxane | 500 | 1.0 | 3.0 | — |
| Example 5-7 | Trichloromethylsilane | 500 | 1.0 | 3.0 | — |
| Experimental Example 5-1 | Chlorine | 500 | 1.0 | 3.0 | — |
| Experimental Example 5-2 | Ammonia | 500 | 1.0 | 3.0 | — |
| Experimental Example 5-3 | Hexamethyldisilazane | 500 | 1.0 | 3.0 | — |
| Experimental Example 5-4 | Hexamethyldisilazane | 800 | 1.0 | 3.0 | — |
| Experimental Example 5-5 | Nitrogen | 500 | 1.0 | 3.0 | — |

(b)

| | Pressure treatment | | |
|---|---|---|---|
| | Temperature (° C.) | Pressure (kg/cm$^2$) | Time (hrs) |
| Example 5-1 | 1400 | 1000 | 2 |
| Example 5-2 | 1400 | 1000 | 2 |
| Example 5-3 | 1400 | 9 | 30 |
| Example 5-4 | 1400 | 1000 | 2 |
| Example 5-5 | 1400 | 1000 | 2 |
| Example 5-6 | 1400 | 1000 | 2 |
| Example 5-7 | 1400 | 1000 | 2 |
| Experimental Example 5-1 | — | | |
| Experimental Example 5-2 | — | | |
| Experimental Example 5-3 | — | | |
| Experimental Example 5-4 | — | | |
| Experimental Example 5-5 | — | | |

The resulting quartz glass body was measured for the hydroxyl group concentration, chlorine concentration, carbon concentration and nitrogen concentration remaining in the subject quartz glass and the viscosity at 1,280° C. in the same manners as in Example 1-1. A bubble generation test (VAC) was carried out by treating a sample at 1,800° C. for one hour in vacuo and visually confirming bubbles as newly generated in the inside of the sample after the test. The results obtained are shown in Table 10. Incidentally, in Table 10, the viscosity was shown in terms of its logarithmic value (log η).

TABLE 10

|  | Hydroxyl group concentration (ppm) | Chlorine concentration (ppm) | Carbon concentration (ppm) | Nitrogen concentration (ppm) | Viscosity at 1280° C. (log η) | Bubble generation test VAC |
|---|---|---|---|---|---|---|
| Example 5-1 | <1 | <30 | 10 | 10 | 12.1 | No bubble |
| Example 5-2 | <1 | <30 | 1000 | 400 | 12.2 | No bubble |
| Example 5-3 | <1 | <30 | 10 | 10 | 12.2 | No bubble |
| Example 5-4 | <1 | <30 | 10 | 400 | 12.2 | No bubble |
| Example 5-5 | <1 | <30 | 10 | 400 | 12.2 | No bubble |
| Example 5-6 | <1 | <30 | 10 | 10 | 12.1 | No bubble |
| Example 5-7 | <1 | 1500 | 10 | 10 | 11.9 | No bubble |
| Experimental Example 5-1 | <1 | 1900 | 10 | 10 | 11.5 | No bubble |
| Experimental Example 5-2 | <1 | <30 | 10 | 520 | 12.0 | Vigorous bubble generation |
| Experimental Example 5-3 | <1 | <30 | 100 | 80 | 12.3 | Bubble generation |
| Experimental Example 5-4 | <1 | <30 | 1000 | 400 | 12.3 | Vigorous bubble generation |
| Experimental Example 5-5 | 100 | <30 | 10 | 10 | 11.6 | No bubble |
| Natural article | 170 | <30 | 10 | 10 | 11.9 | No bubble |

All of the quartz glasses obtained in Examples 5-1 to 5-7 had a viscosity at the time of high temperature approximately equal to or higher than the viscosity of the natural quartz made of a natural quartz crystal as the raw material (Experimental Example 5-6) and were hardly deformed even in the high-temperature environment. On the other hand, though the quartz glass of Experimental Example 5-1 was thoroughly dehydrated, it had a high residual concentration of chlorine and had a low viscosity. In the quartz glasses of Experimental Examples 5-2, 5-3 and 5-4, though the viscosity was comparable to that of the natural quartz, a number of air bubbles were generated; and in the quartz glass of Experimental Example 5-5, OH remained due to baking in vacuo, the amount of which was, however, slightly lowered, and the viscosity was low. Also, in Examples 5-1 to 5-7, the absorption coefficient at 245 nm was measured in the same manner as in Example 1-1. As a result, in all of these Examples, an absorption coefficient of 0.05 cm$^{-1}$ or more was obtained.

Example 6-1

About 1 kg of a porous body of a quartz glass body (OH group content: 200 ppm) in a column form having a diameter of 100 mm as obtained by flame hydrolysis of tetrachlorosilane was set in a quartz glass-made furnace core tube (diameter: 200 mm) installed in an electric furnace. Next, the inside of the furnace core tube was evacuated, heated at 500° C., and preheated at that temperature for 60 minutes.

Thereafter, the temperature was raised to the reaction temperature, and 1.9 g of a hexamethyldisilazane vapor was fed as a reaction gas while diluting with an N$_2$ gas, thereby reacting with the OH group in the porous body. The heating was carried out at the reaction temperature as shown in Table 11 while keeping that temperature for 3 hours. Incidentally, a flow rate of the N$_2$ gas is 1 mole/hr. After completion of the reaction, the treated porous body was transferred into a vacuum furnace, the temperature was raised to 800° C., and the pressure was reduced to 1×10$^{-3}$ mmHg or lower. After keeping for one hour, the temperature was further raised to 1,600° C. at 10° C./min, thereby obtaining a densified quartz glass.

TABLE 11

| | Reaction with volatile silicon compounds | | |
|---|---|---|---|
| | Reaction gas | Reaction temperature (° C.) | Throwing amount (g) | Processing heating test |
| Example 6-1 | Hexamethyldisilazane | 500 | 1.9 | Flame melting→ No bubble generation |
| Example 6-2 | Hexamethyldisilazane | 500 | 15.0 | Electrical melting→ No bubble generation Flame melting→ Bubble generation |
| Example 6-3 | Hexamethyldisilazane | 500 | 15.0 | Flame melting→ No bubble generation |
| Example 6-4 | Trichloromethylsilane | 500 | 0.5 | Flame melting→ No bubble generation |
| Example 6-5 | Hexamethyldisiloxane | 500 | 1.9 | Flame melting→ No bubble generation |

TABLE 11-continued

| | Reaction with volatile silicon compounds | | | |
|---|---|---|---|---|
| | Reaction gas | Reaction temperature (° C.) | Throwing amount (g) | Processing heating test |
| Experimental Example 6-1 | Chlorine | 500 | 100 | Flame melting→ No bubble generation |
| Experimental Example 6-2 | Hexamethyldisilazane | 500 | 6.0 | Flame melting→ Bubble generation |
| Experimental Example 6-3 | Nitrogen | 500 | — | Flame melting→ No bubble generation |

Examples 6-2 to 6-5

As shown in Table 11, a hexamethyldisilazane vapor or a trichloromethylsilane gas or hexamethyldisiloxane was used as the reaction gas in a throwing amount as shown in Table 11. Also, especially in Example 6-3, in order to make 5 mm of the surface as a transparent layer, an experiment was carried out in the same manner as in Example 6-1, except for raising the temperature from 800° C. to 1,600° C. at 20° C./min at the time of vacuum sintering, thereby obtaining a densified quartz glass body.

Experimental Examples 6-1 to 6-3

As Experimental Example 6-1, a dehydration reaction was carried out using a conventional chlorine gas as the reaction gas. In Experimental Example 6-2, a dehydration reaction was carried out using hexamethyldisilazane as the reaction gas in a throwing amount as shown in Table 11. Experimental Example 6-3 is one in which baking of the porous body was carried out without using the reaction gas. The reaction between the porous body and the reaction gas was carried out under the condition as shown in Table 11, and after baking, densified quartz glasses were obtained under the same treatment conditions as in Example 6-1.

Experimental Example 6-4

As Experimental Example 6-4, a quartz glass prepared by melting a natural quartz crystal by an oxyhydrogen flame was used.

With respect to each of the resulting quartz glass bodies, the surface site (surface depth: from 1 mm to 20 mm) and the internal site were respectively collected and measured for the hydroxyl group concentration, chlorine concentration, carbon concentration and nitrogen concentration remaining in the subject quartz glass and the viscosity at 1,280° C. were measured in the same manners as in Example 1-1. With respect to Example 6-2, a black portion was skived out from the resulting quartz glass body and measured for the surface site and the internal site of the black quartz glass body. Further, the color of the quartz glass body was visually discriminated. The results obtained are shown in Table 12. In Table 12, the viscosity was shown in terms of its logarithmic value (log η).

Also, with respect to each of the resulting quartz glass bodies, a processing heating test was carried out. A processing heating test by flame melting is one in which a glass body sample is irradiated with a flame by an acetylene gas burner, thereby confirming the generation of bubbles in the glass body; and a processing heating test by electrical melting is one carried out in vacuo in a carbon heater heating furnace. The results obtained are shown in Table 11.

TABLE 12

| | Site | Color | Hydroxyl group concentration (ppm) | Chlorine concentration (ppm) | Carbon concentration (ppm) | Nitrogen concentration (ppm) | Viscosity at 1280° C. (log η) |
|---|---|---|---|---|---|---|---|
| Example 6-1 | Surface | Transparent | <1 | <30 | 10 | 10 | 12.1 |
| | Internal | Transparent | <1 | <30 | 10 | 10 | 12.1 |
| Example 6-2 | Surface | Black | <1 | <30 | 500 | 20 | 12.2 |
| | Internal | Black | <1 | <30 | 500 | 20 | 12.2 |
| Example 6-3 | Surface | Transparent | <1 | <30 | 10 | 10 | 12.2 |
| | Internal | Black | <1 | <30 | 500 | 20 | 12.2 |
| Example 6-4 | Surface | Transparent | <1 | 500 | 10 | 2 | 11.9 |
| | Internal | Transparent | 80 | <30 | 10 | 2 | 11.5 |
| Example 6-5 | Surface | Transparent | <1 | <30 | 10 | 2 | 12.1 |
| | Internal | Transparent | <1 | <30 | 10 | 2 | 12.1 |
| Experimental Example 6-1 | Surface | Transparent | <1 | 1900 | 10 | 2 | 11.5 |
| | Internal | Transparent | <1 | 1900 | 10 | 2 | 11.5 |
| Experimental Example 6-2 | Surface | Transparent | <1 | <30 | 40 | 20 | 12.2 |
| | Internal | Transparent | <1 | <30 | 50 | 20 | 12.2 |
| Experimental Example 6-3 | Surface | Transparent | 120 | <30 | 2 | 2 | 11.5 |
| | Internal | Transparent | 120 | <30 | 2 | 2 | 11.5 |
| Experimental Example 6-4 (Natural article) | Whole | Transparent | 170 | <30 | 10 | 10 | 11.9 |

As shown in Table 12, all of the quartz glasses obtained in Examples 6-1 to 6-5 had a viscosity at the time of high temperature approximately equal to or higher than the viscosity of the natural quartz made of a natural quartz crystal as the raw material (Experimental Example 6-4) and were hardly deformed even in the high-temperature environment. On the other hand, though the quartz glass of Experimental Example 6-1 was thoroughly dehydrated, it had a high residual concentration of chlorine and had a low viscosity. In the quartz glass of Experimental Example 6-2, though the viscosity was comparable to that of the natural quartz, a number of air bubbles were generated after the processing heating test by flame heat melting; and in the quartz glass of Experimental Example 6-3, OH remained due to baking in vacuo, and the viscosity was low. Also, in Examples 6-1 to 6-5, the absorption coefficient at 245 nm was measured in the same manner as in Example 1-1. As a result, in all of these Examples, an absorption coefficient of $0.05$ $cm^{-1}$ or more was obtained.

Capability of Exploitation in Industry:

In the light of the above, according to the production process of a synthetic quartz glass of the present invention, it is possible to easily and efficiently produce a synthetic quartz glass which has less impurity, has a high-temperature viscosity characteristic equal to or more than that of a natural quartz glass, and hardly deforms even in a high-temperature environment, and especially a highly heat resistant synthetic quartz glass which is free from the generation of bubbles and is dense.

According to the synthetic quartz glass body of the present invention, it is possible to provide a transparent and black synthetic quartz glass which has less impurity, has a high-temperature viscosity characteristic equal to or more than that of a natural quartz glass, and hardly deforms even in a high-temperature environment, and especially a quartz glass body which is free from the generation of bubbles, is dense, has high infrared absorption rate and emission rate, and has an extremely high effect for preventing diffusion of alkali metal.

In the light of the above, the present invention is useful for a quartz glass jig to be used in the production steps for carrying out a heating treatment of a silicon wafer or forming a CVD film on the surface, and especially, in recent years, since a synthetic quartz which is lowered in metal impurities and suited for a high-temperature treatment is desired as a raw material, the present invention complies with an expectation of the industrial field to a great extent.

The invention claimed is:

1. A production process of a highly heat-resistant synthetic quartz glass having an absorption coefficient at 245 nm of $0.05$ $cm^{-1}$ or more, comprising the steps in the sequence set forth:

preparing a silica porous body, conducting a reduction treatment to the silica porous body in an atmosphere containing a reducing gas at a reaction temperature of 100° C. or higher and 1,300° C. or lower for 30 minutes or more, conducting a baking treatment to the silica porous body at a reaction temperature of 1,300° C. or higher and 1,900° C. or lower, thereby forming a dense glass body having an absorption coefficient at 245 nm of $0.05$ $cm^{-1}$ or more, wherein said reducing gas is a volatile silicon compound containing nitrogen and/or carbon, and said volatile silicon compound is at least one kind of compound selected from the group consisting of an organosiloxane, an alkoxysilane, an aroxysilane, an organosilane, and an organopolysilane and wherein the dense glass body has a natural logarithmic value of viscosity at 1280° C. in an approximate range of 11.7 and 12.4.

2. The production process of a highly heat-resistant synthetic quartz glass according to claim 1, which is characterized in that the reduction treatment is carried out at a reaction temperature of 100° C. or higher and 800° C. or lower, followed by baking at 1,300° C. or higher and 1,900° C. or lower, thereby obtaining a transparent glass body.

3. The production process of a highly heat-resistant synthetic quartz glass according to claim 1, which is characterized in that the silica porous body is subjected to the reduction treatment by reacting with a carbon-containing gas at 400° C. or higher and 1,300° C. or lower, followed by baking at 1,300° C. or higher and 1,900° C. or lower, thereby obtaining a densified black glass body.

4. The production process of a highly heat-resistant synthetic quartz glass according to claim 1, which is characterized in that after the reduction treatment, a heating treatment is carried out in an atmosphere containing hydrogen, followed by subjecting to a baking treatment, thereby obtaining a dense glass body.

5. The production process of a highly heat-resistant synthetic quartz glass according to claim 1, which is characterized in that the dense glass body is further subjected to a heating treatment in a non-oxidative atmosphere under a pressure exceeding the atmospheric pressure in the temperature range of from 1,200° C. to 1,900° C.

6. The production process of a highly heat-resistant synthetic quartz glass according to claim 5, which is characterized in that the dense glass body is subjected to the heating treatment in an inert gas atmosphere under a pressure exceeding the atmospheric pressure and up to 10,000 $kg/cm^2$ in the temperature range of from 1,200° C. to 1,900° C.

7. A production process of a highly heat-resistant synthetic quartz glass having an absorption coefficient at 245 nm of $0.05$ $cm^{-1}$ or more, comprising the steps in the sequence set forth:

preparing a silica porous body, conducting a reduction treatment to the silica porous body in an atmosphere containing a reducing gas at a reaction temperature of 100° C. or higher and 1,300° C. or lower for 30 minutes or more, conducting a baking treatment to the silica porous body at a reaction temperature of 1,300° C. or higher and 1,900° C. or lower, thereby forming a dense glass body having an absorption coefficient at 245 nm of $0.05$ $cm^{-1}$ or more, wherein said reducing gas is a volatile silicon compound containing nitrogen and/or carbon, and said volatile silicon compound is at least one kind of compound selected from the group consisting of a silazane and an organosilazane, after the reduction treatment, a heating treatment is carried out in an atmosphere containing hydrogen, followed by subjecting to a baking treatment, thereby obtaining a dense glass body and wherein the dense glass body has a natural logarithmic value of viscosity at 1280° C. in an approximate range of 11.7 and 12.4.

8. The production process of a highly heat-resistant synthetic quartz glass according to claim 7, which is characterized in that the reduction treatment is carried out at a reaction temperature of 100° C. or higher and 800° C. or lower, followed by baking at 1,300° C. or higher and 1,900° C. or lower, thereby obtaining a transparent glass body.

9. The production process of a highly heat-resistant synthetic quartz glass according to claim 7, which is characterized in that the silica porous body is subjected to the reduction treatment by reacting with a carbon-containing gas at 400° C. or higher and 1,300° C. or lower, followed by baking at 1,300° C. or higher and 1,900° C. or lower, thereby obtaining a densified black glass body.

10. The production process of a highly heat-resistant synthetic quartz glass according to claim 7, which is characterized in that the dense glass body is further subjected to a heating treatment in a non-oxidative atmosphere under a pressure exceeding the atmospheric pressure in the temperature range of from 1,200° C. to 1,900° C.

11. The production process of a highly heat-resistant synthetic quartz glass according to claim 10, which is characterized in that the dense glass body is subjected to the heating treatment in an inert gas atmosphere under a pressure exceeding the atmospheric pressure and up to 10,000 kg/cm$^2$ in the temperature range of from 1,200° C. to 1,900° C.

12. A production process of a highly heat-resistant synthetic quartz glass having an absorption coefficient at 245 nm of 0.05 cm$^{-1}$ or more comprising the steps in the sequence set forth:
preparing a silica porous body,
conducting a reduction treatment to the silica porous body in an atmosphere containing a reducing gas at a reaction temperature of 100° C. or higher and 1,300° C. or lower for 30 minutes or more,
conducting a baking treatment to the silica porous body at a reaction temperature of 1,300° C. or higher and 1,900° C. or lower, thereby forming a dense glass body having an absorption coefficient at 245 nm of 0.05 cm$^{-1}$ or more,
wherein said reducing gas is a volatile silicon compound containing nitrogen and/or carbon,
wherein the volatile silicon compound is hexamethyldisilazane and
wherein the dense glass body has a natural logarithmic value of viscosity at 1280° C. in an approximate range of 11.7 and 12.4.

13. A production process of a highly heat-resistant synthetic quartz glass having an absorption coefficient at 245 nm of 0.05 cm−1 or more comprising the steps in the sequence set forth:
preparing a silica porous body,
conducting a reduction treatment to the silica porous body in an atmosphere containing a reducing gas at a reaction temperature of 100° C. or higher and 1,300° C. or lower,
conducting a baking treatment to the silica porous body at a reaction temperature of 1,300° C. or higher and 1,900° C. or lower for 30 minutes or more, thereby forming a dense glass body having an absorption coefficient at 245 nm of 0.05 cm$^{-1}$ or more,
wherein said reducing gas is a volatile silicon compound containing nitrogen and/or carbon,
wherein the volatile silicon compound is hexamethyldisiloxane and
wherein the dense glass body has a natural logarithmic value of viscosity at 1280° C. in an approximate range of 11.7 and 12.4.

* * * * *